United States Patent [19]
Komori et al.

[11] 3,740,132
[45] June 19, 1973

[54] ELECTROPHOTOGRAPHIC APPARATUS

[75] Inventors: Shigehiro Komori, Yokohama; Jiro Sato, Kawasaki; Hiroyuki Hattori, Tokyo, all of Japan

[73] Assignee: Canon Kabushiki Kaisha, Tokyo, Japan

[22] Filed: Jan. 29, 1971

[21] Appl. No.: 111,058

[30] Foreign Application Priority Data
Feb. 2, 1970 Japan.................................. 45/9197
Feb. 18, 1970 Japan................................45/13934
Mar. 7, 1970 Japan................................45/19462

[52] U.S. Cl. ......................... 355/3, 355/8, 355/10, 355/11, 355/13
[51] Int. Cl............................................. G03g 15/00
[58] Field of Search ...................... 355/3, 8, 10, 11, 355/13, 14; 118/637; 117/17.5; 271/84, 54

[56] References Cited
UNITED STATES PATENTS

| | | | |
|---|---|---|---|
| 3,567,344 | 3/1971 | Ogawa et al. .......................... | 355/8 |
| 3,575,503 | 4/1971 | Van Auken et al. ................... | 355/8 |
| 3,600,083 | 8/1971 | Leedom .................................. | 355/3 X |
| 3,469,908 | 9/1969 | Marek et al. .......................... | 355/3 |
| 3,533,691 | 10/1970 | Suzuki et al. ......................... | 355/13 |
| 3,467,469 | 9/1969 | Hastings et al. .................. | 355/13 X |
| 3,494,328 | 2/1970 | Maloney............................. | 118/637 |
| 3,424,526 | 1/1969 | Sacre .................................... | 355/10 |

FOREIGN PATENTS OR APPLICATIONS

| | | | |
|---|---|---|---|
| 1,813,738 | 10/1969 | Germany ............................... | 355/8 |
| 1,903,461 | 8/1969 | Germany ............................... | 355/8 |

*Primary Examiner*—Robert P. Greiner
*Attorney*—Ward, McElhannon, Brooks & Fitzpatrick

[57] ABSTRACT

An electrophotographic copying apparatus, especially suitable for use in offices, having an improved optical system for reducing the space between an original illuminating station and an exposure station while maintaining a required light path length, and having an original carriage disposed for horizontal sliding movement on top of the apparatus. The various copy paper processing devices of the apparatus are disposed about the optical system in a compact manner, wherein the processing devices include a device for electrically charging lengths of copy paper; a device exposing the charged paper; a device for developing the exposed paper; a device for fixing and drying the developed copies; and a device for cooling the apparatus. The optical system includes various conventional mirrors and an in-mirror lens arranged to provide a folded light path. Disclosed also is structure for loading, feeding, and cutting copy paper supplied within the apparatus in roll form.

10 Claims, 41 Drawing Figures

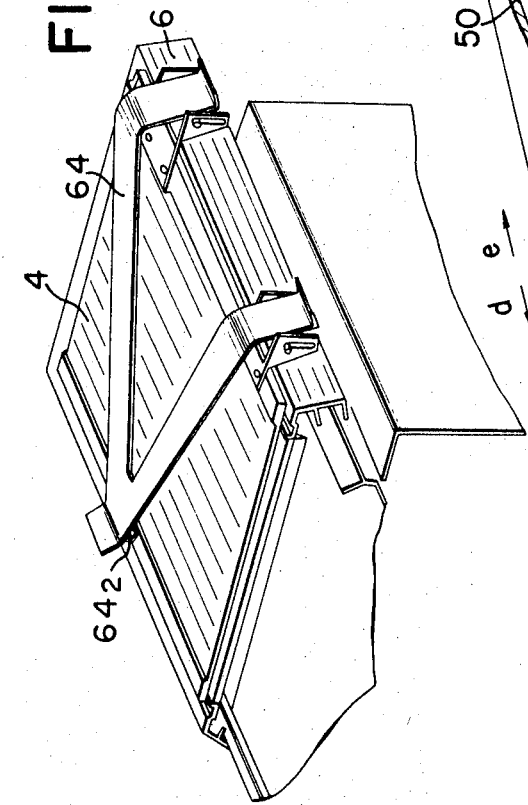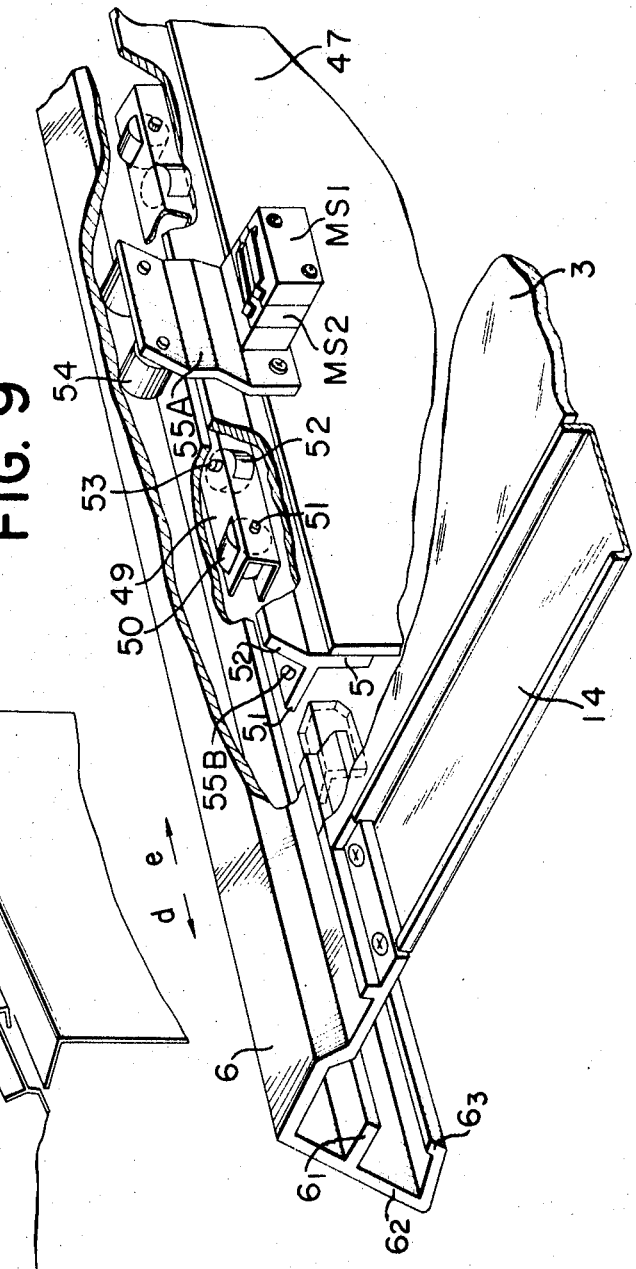

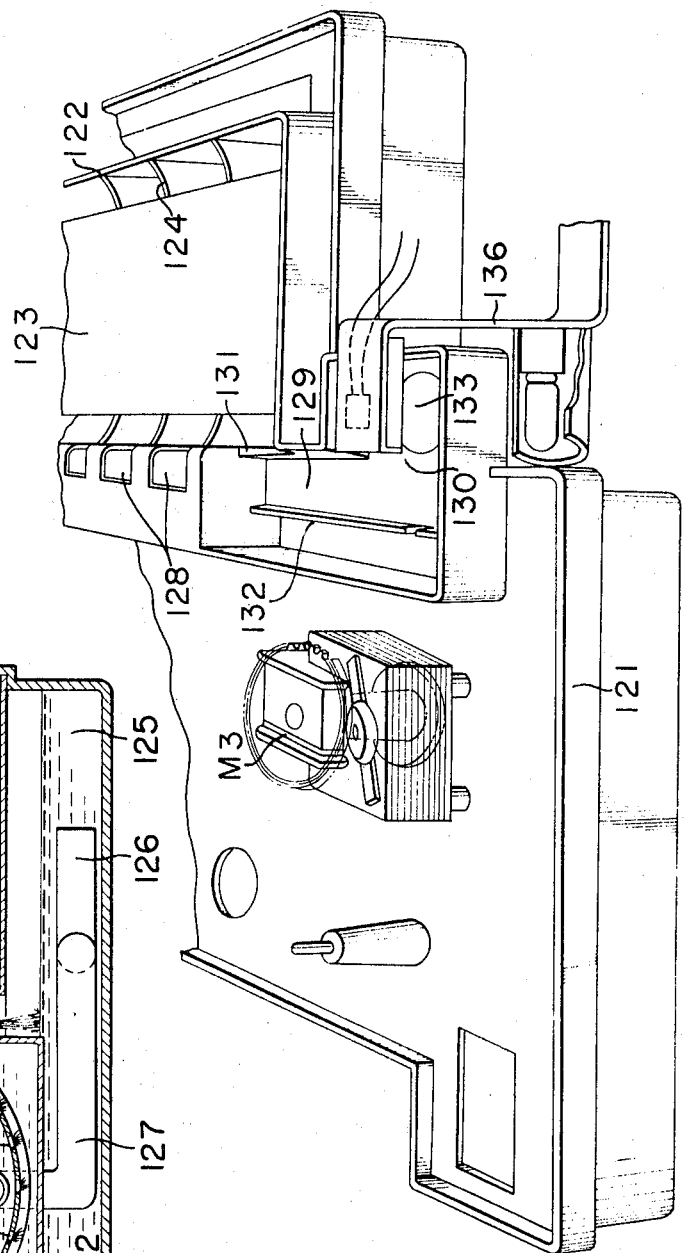
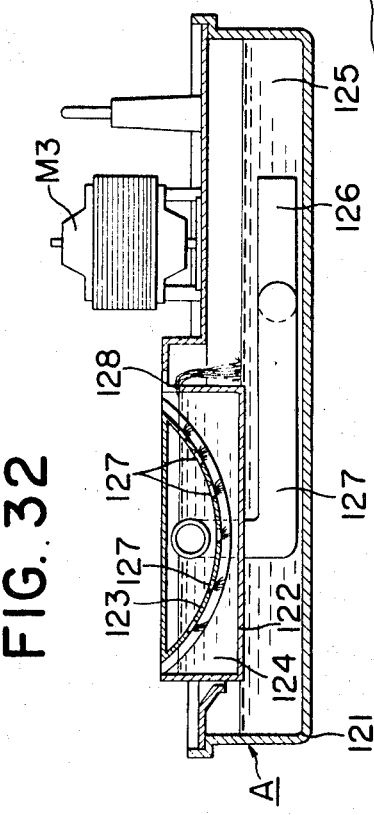
FIG. 30
FIG. 32

ELECTROPHOTOGRAPHIC APPARATUS

BACKGROUND OF THE INVENTION

1. Field of the Invention

This invention generally relates to an electrophotographic copying apparatus of the type in which an original carriage is horizontally reciprocated for copying while effecting a through-slit exposure. More specifically, it relates to an electrophotographic copying apparatus of the type having a movable original carriage and whose optical system has been improved so as to extremely reduce the space between an original illuminating station and an exposure station while maintaining a required length of light path, whereby various processing means are disposed about the optical system in a compact manner.

2. Description of the Prior Art

In the electrophotographic copying apparatuses of the type having a reciprocating original carriage, it has often been the case that the original illuminating station is disposed within the machine housing adjacent to one side portion thereof. As a result, the original carriage is normally projected outwardly of the machine housing by a distance corresponding to the distance over which the original carriage travels, which in turn has led to a greater space required to install the apparatus. When the original illuminating station may be disposed centrally of the machine housing, the apparatus has become greater in size because in this case various processing means are disposed so as to maintain a required length of light path and not to interrupt the light path. The illuminating station thus disposed centrally of the apparatus is likely to cause the temperature in the apparatus to be increased by the heat provided by the illuminator, and such temperature rise may lead to adverse effects such as evaporation of the developing liquid.

SUMMARY OF THE INVENTION

It is an object of the present invention to provide an electrophotographic copying apparatus especially suitable for use in offices whose optical system has been improved so as to extremely reduce the space between an original illuminating station and an exposure station while maintaining a required length of light path and in which various processing means are disposed about the optical system in a compact manner.

It is another object of the present invention to provide an electrophotographic copying apparatus convenient for packing and installation in which the original illuminating station in the optical system is disposed substantially centrally of the apparatus on top thereof so as to reduce the length over which the horizontally reciprocating original carriage is extended outwardly of the machine housing, to thereby attain a compact structure of the entire apparatus which can minimize the space occupied by the apparatus, especially without original carriage guide rails being normally projected laterally of the machine housing.

It is still another object of the present invention to provide an electrophotographic copying apparatus in which electrically charging means is disposed on that side of the apparatus adjacent to exposure means in the optical system, cooling means and fixing-drying means are disposed on the opposite side, and developing means is disposed below the optical system, these three locations being isolated from one another within the machine housing to thereby enhance cooling effect so as to reduce the amount of heat stored within the machine even during high-speed copying operation.

It is yet another object of the present invention to provide an electrophotographic copying apparatus which is simple in entire mechanism and rigid in construction and in which the geometrical length between the original illuminating station and the exposure means in the optical system is reduced so that rollers and other copying medium transport means can be mounted on a frame to which the optical system is fixed with high accuracy.

It is still another object of the present invention to provide an electrophotographic copying apparatus in which various processing means are disposed in the described manner so as to feed photosensitive medium from the upper part of one side of the apparatus obliquely downwardly into developing means disposed centrally of the machine bottom and further obliquely upwardly into fixing means, thus providing a very smooth passage of the photosensitive medium without jamming in the machine.

It is another object of the present invention to provide, in the electrophotographic copying apparatus of the described type, a space for accommodating therein such means as automatic developer supply means, motor, copy selector and the like by utilizing the space behind and/or on the opposite sides of the electrically charging means and exposure means.

It is still another object of the present invention to provide an electrophotographic copying apparatus which can reduce the waste of copying medium by using a roll of copying medium which may be randomly cut into a size corresponding to an original to be copied during copying operation.

It is yet another object of the present invention to provide, in the above-described copying apparatus, simple means for disposing of the last fraction of the roll of copying medium by transporting such last fraction through the apparatus, thus solving the problem of jamming and eliminating the trouble of removing the last fraction of copying medium from the machine while achieving the most economical utilization of the copying medium without unnecessary waste thereof.

These objects and features of the present invention will become fully apparent from the following detailed description taken in conjunction with the accompanying drawings.

BRIEF DESCRIPTION OF THE DRAWINGS

FIGS. 9 to 10 are enlarged views of the slide mechanism for the original carriage.

FIGS. 15 to 17 show the construction of the original keep plate.

FIG. 30 is an enlarged, fragmentary perspective view showing an example of the developing means according to the present invention.

FIGS. 32 to 34 are sectional views taken along lines A—A, B—B and C—C of FIG. 31.

DESCRIPTION OF THE PREFERRED EMBODIMENTS

The electrophotographic copying apparatus of the present invention comprises various parts or means which per se are of novelty. Description will therefore be made by dividing the apparatus into such novel parts, which include: a horizontally reciprocating original carriage disposed on top of the machine housing; an illuminator lamp disposed within the machine housing substantially centrally thereof for illuminating an original to be copied from therebelow; a special optical system consisting of mirrors, an in-mirror lens, etc. disposed substantially centrally of the machine housing; electrically charging means and exposure means angularly disposed at one side of the optical system so as to pass copying medium obliquely downwardly; cooling means and fixing-drying means disposed at the opposite side of the optical system; developing means disposed below the optical system; means for driving the reciprocating original carriage; and means for loading and feeding a roll of copying medium.

Figure 1:
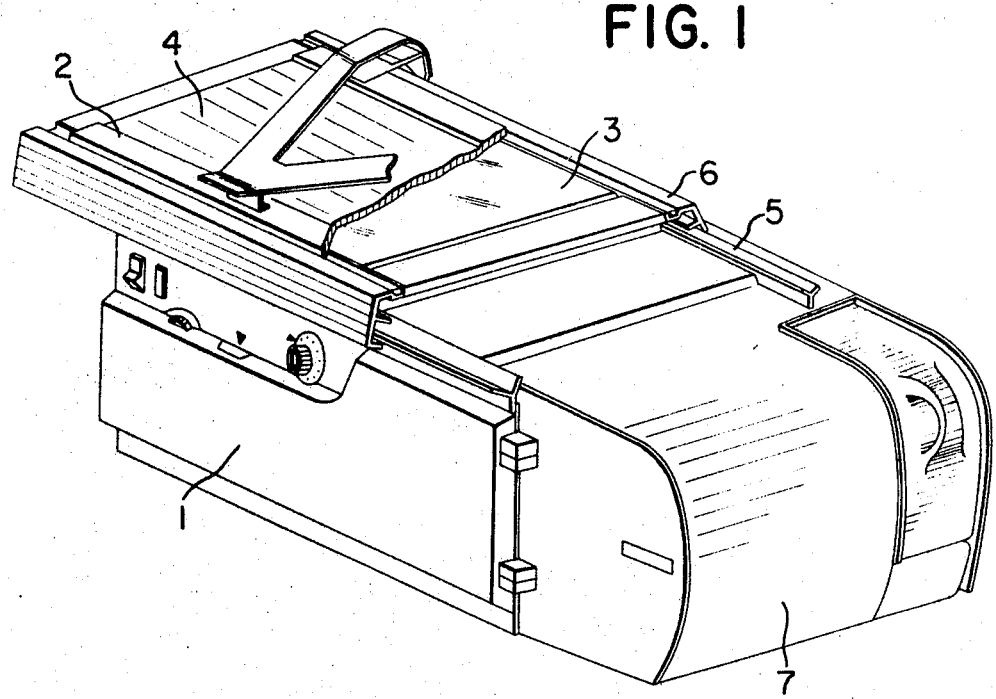
FIG. 1 is a partly broken-away perspective view of the electrophotographic copying apparatus according to an embodiment of the present invention.
Figure 4:
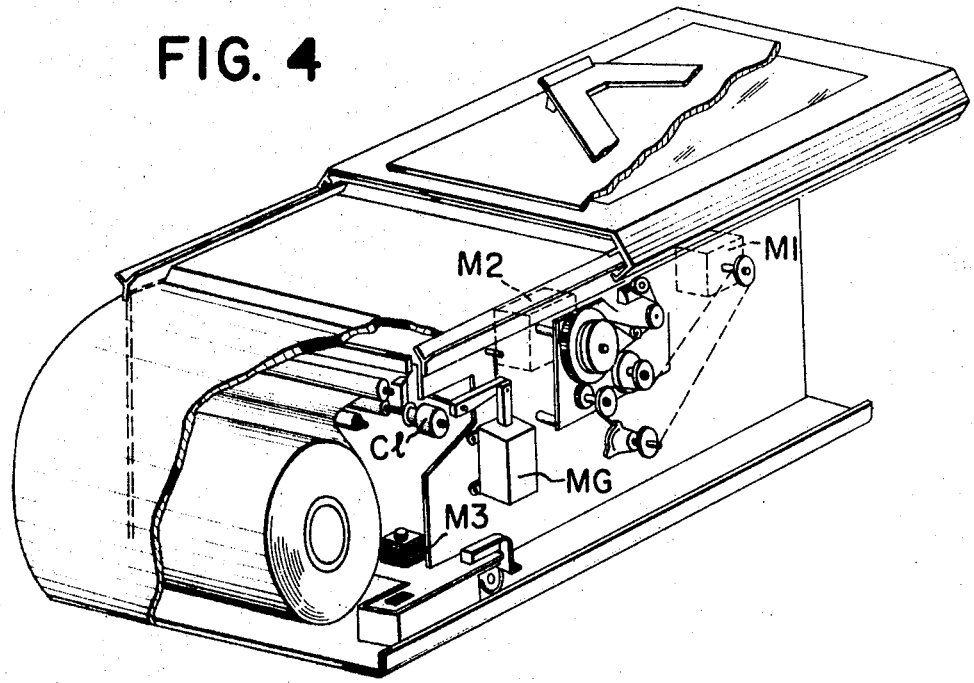
FIG. 4 is a partly broken-away perspective view of the FIG. 1 apparatus as viewed in the opposite direction to FIG. 1.

Referring first to the perspective view of FIG. 1, there is shown an embodiment of the electrophotographic copying apparatus which includes a machine housing 1, an original carriage 2 arranged for horizontal reciprocal movement on top of the housing, and a portion 7 for accommodating therein a roll of copying medium.

Figure 2:
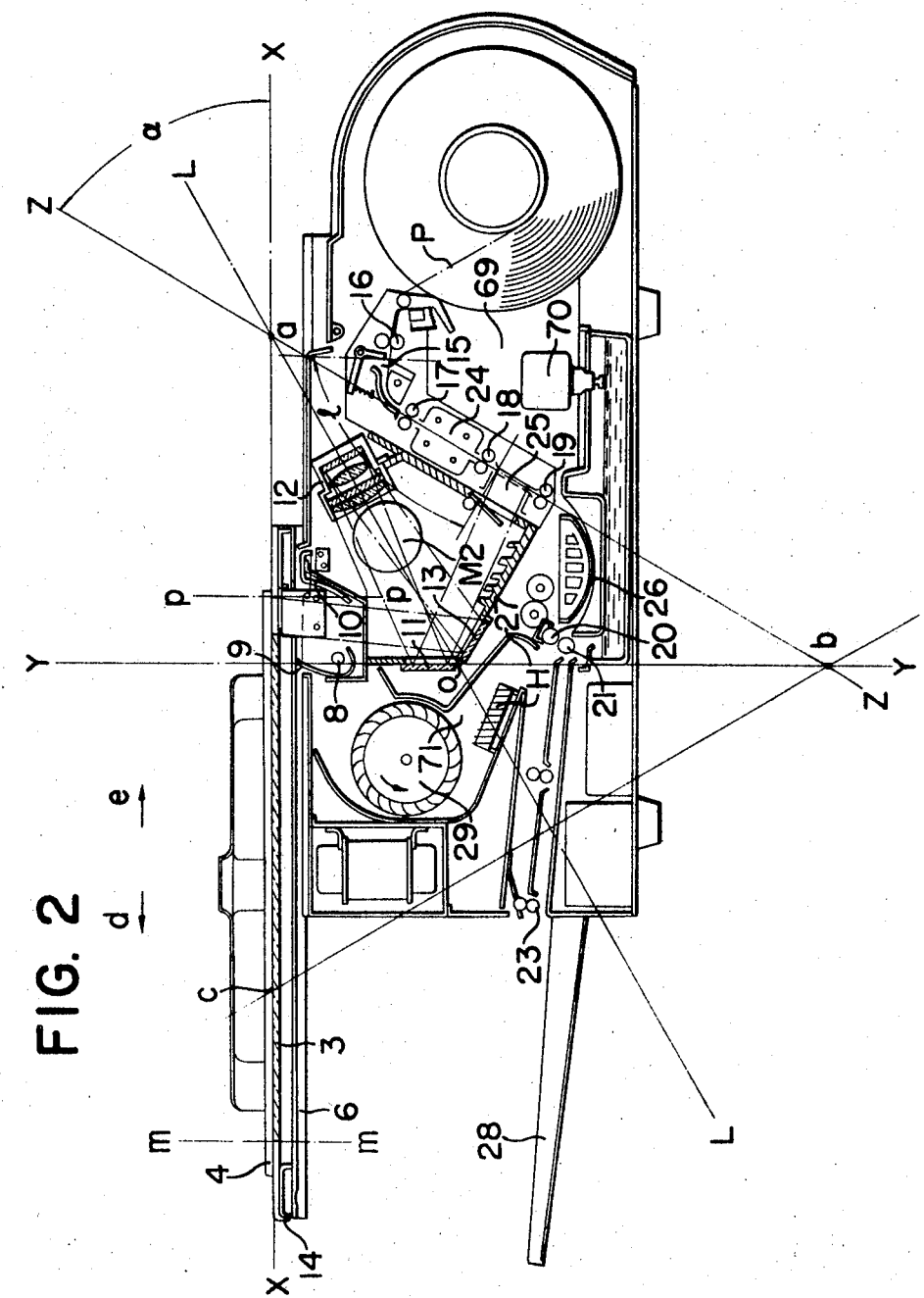
FIG. 2 is a longitudinal cross-sectional view of the apparatus shown in FIG. 1.

As will be seen in FIG. 2, this apparatus is such that during the forward stroke of the original carriage 2 indicated by arrow $e$, a roll of copying medium P is fed until its leading edge is about to reach exposure means to be described, and that during the backward stroke of the carriage 2 indicated by arrow $d$, a through-slit exposure is effected for the copying medium P in synchronism with the moving velocity thereof until the carriage 2 returns to its initial position. At an appropriate point of time during the forward stroke of the carriage 2, a cutter will be operated to cut the web of copying medium P into a sheet of desired size. The sheet of copying medium thus provided by cutting will pass through electrically charging means 24, exposure means 25, developing means 26 and fixing means 27 onto a tray 28. On the other hand, the original supported on the carriage 2 will be illuminated from therebelow by an illuminator lamp 8 so that the image light will be directed to the exposure means 25 via an optical system comprising a mirror 11, an in-mirror lens 12 and a mirror 13. Heated air in the neighborhood of the illuminator lamp 8 will be cooled and directed by cooling means 29 into the fixing means.

RECIPROCATING ORIGINAL CARRIAGE

Figure 5:
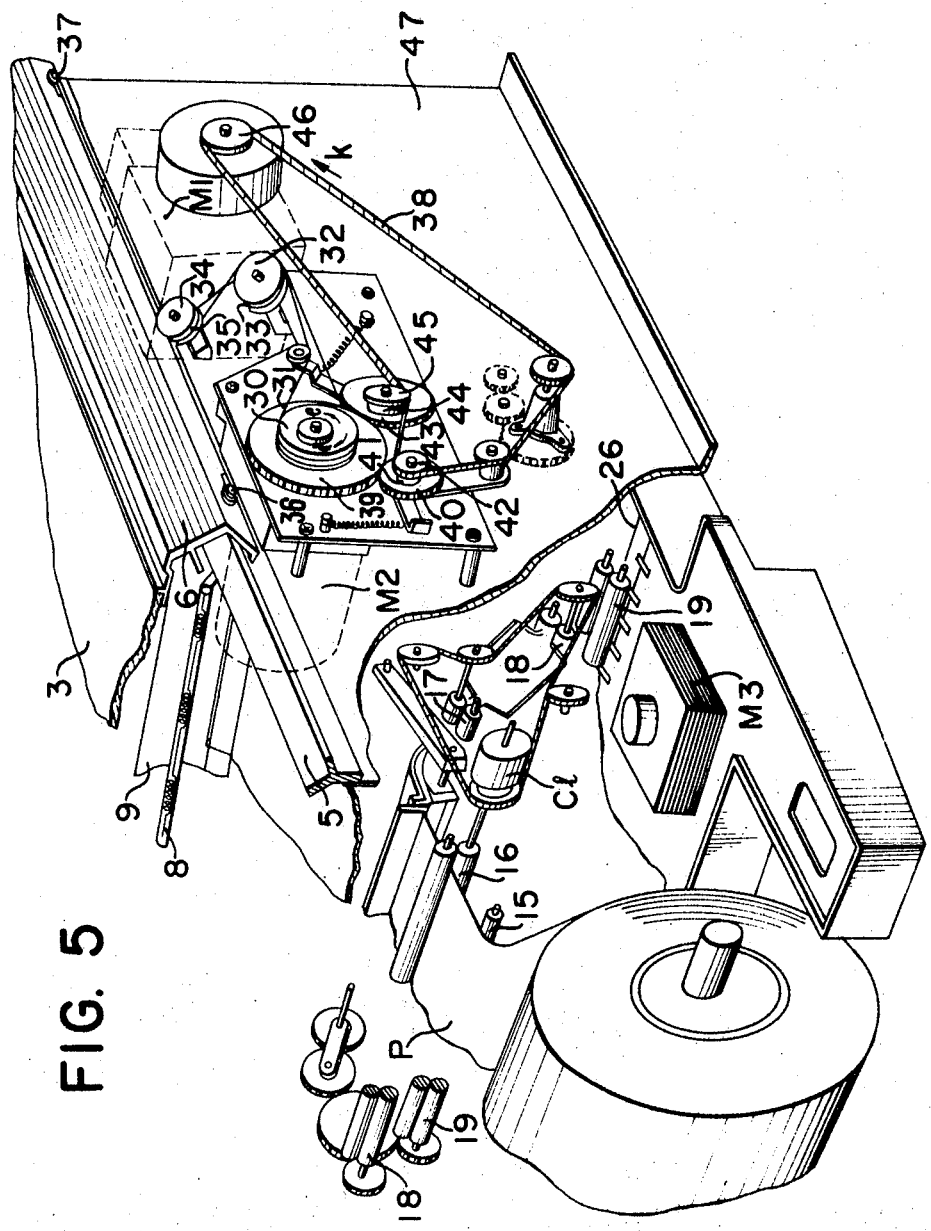
FIGS. 5 to 7 are enlarged schematic views for illustrating the driving system for the same apparatus.
Figure 6:
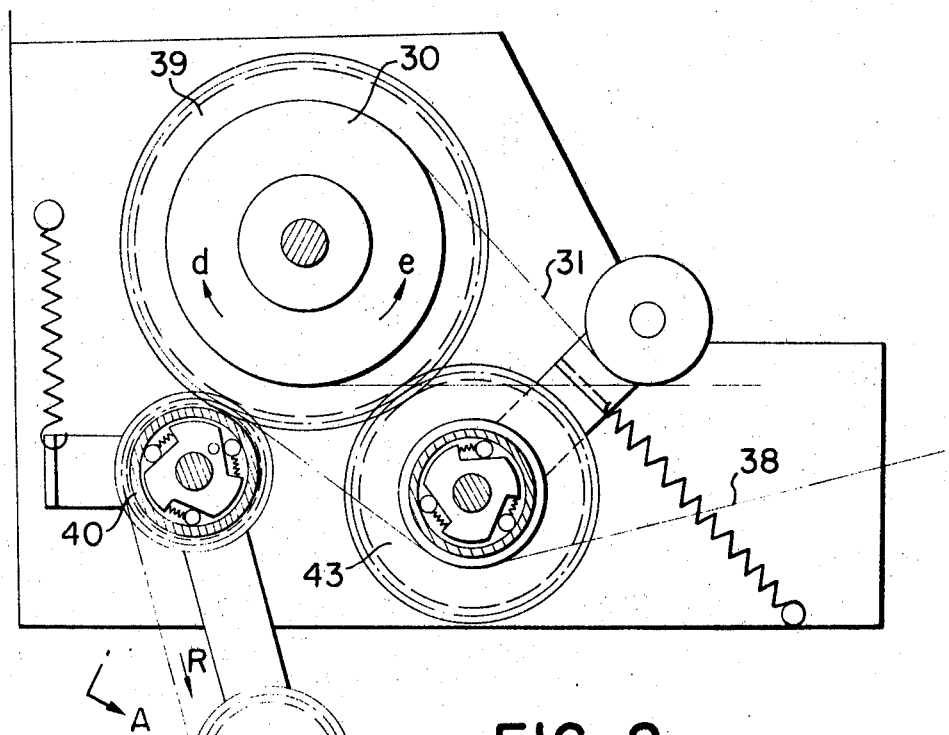
Figure 7:
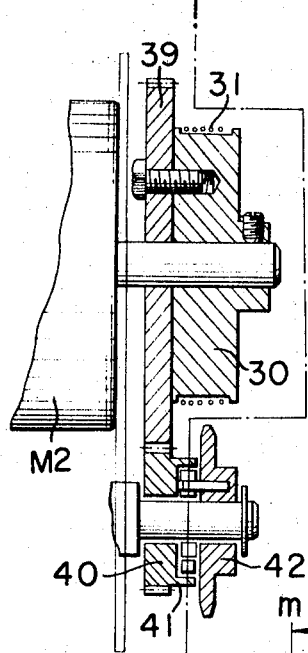

The original carriage 2 includes a glass sheet or screen 3, an original keep pate 4, a pair of rails 5 and a frame 6. Driving system for the original carriage 2 is shown in FIGS. 4 to 7. A reversible motor M2 for driving the carriage has its shaft carrying a drum 30, on which is wound a crossed wire belt 31. The wire belt 31 extends from the drum 30 to guide rollers 32, 33, 34 and 35 in a crossing manner as shown, and the opposite ends of the belt are secured to the opposite ends of the original carriage 2 so that the carriage 2 may be moved along the rails 5. Copying medium transport rollers 16–23 are driven from a constantly rotating motor M1 via a belt or chain 38. The drum 30 mounted on the shaft of the motor M2 is connected to the motor M1, as shown in FIGS. 5–7, through one-way clutches 41 and 44, which rotate in opposite directions to each other.

Thus, both during the forward and backward strokes of the original carriage 2, a gear integral with the drum 30 is connected to the constantly rotating motor M1 through the chain 38 engaging the one-way clutches 41, 42, gears 40, 43 and sprockets 42, 45, 46, so that the original carriage 2 and the copying medium P can be readily positioned with respect to each other due to their synchronized movements.

Instead of the two one-way clutches, use may of course be made of a single one-way clutch to control the synchronization between the movement of the carriage 2 only in one direction and the movement of the copying medium P.

Figure 8:
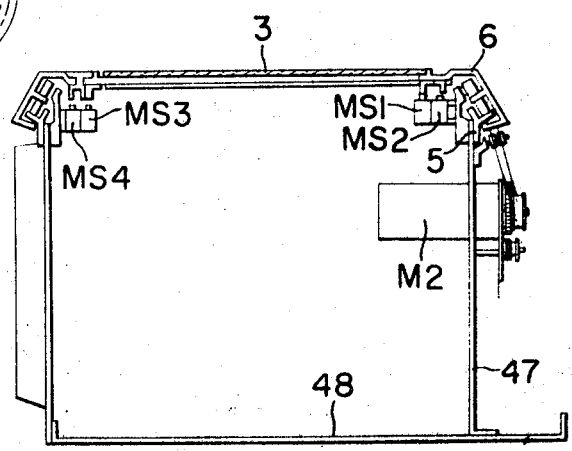
FIG. 8 is a cross-sectional view showing the neighborhood of the original carriage.
Figure 10:
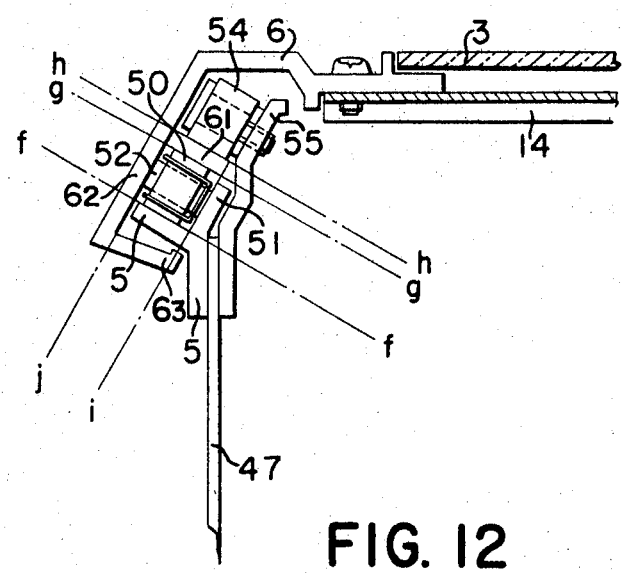

Mechanism for moving the original carriage will now be described with reference to FIGS. 8 to 10 which show an embodiment thereof. Y-shaped rails 5 are suitably secured to the side plates $47_1$ and $47_2$ or the frame of the machine housing 1 and are disposed parallel on top of the housing longitudinally thereof. The upper arms $5_1$ and $5_2$ of the Y-shaped rails 5 are open preferably at an angle of about 90°, and they are tilted so as to receive components of the load of the carriage 2. The length of each rail 5 is substantially equal to the length of the machine housing.

E-shaped rails 6 formed integrally with the carriage 2 are in engagement with the Y-shaped rails 5 secured to the carriage 2. The opposite E-shaped rails 6 are interconnected by a transverse frame 14 which may be in the form of angle or the like. Numeral 3 designates a glass sheet or screen for supporting thereon an original to be copied. A U-shaped or square retainer 49 is inserted in the space between the arms $5_1$, $6_1$ and $5_2$, $6_2$ of the Y-shaped and E-shaped rails 5 and 6 which are in engagement with each other as described. A plurality of rollers 50 are journalled to the retainer 49 by means of transverse shafts 51 so as to receive the vertical component of the load of the carriage 2 acting perpendicularly to the arm $5_1$ of the Y-shaped rail. A plurality of rollers 52 are mounted in the retainer 49 by means of vertical shafts 53 so as to receive the component of said load acting perpendicularly to the other arm $5_2$ of the Y-shaped rail 5. All these rollers may be replaced by balls, if desired.

Keep and guide rollers 54 are journalled to the housing wall plates 47 or to the Y-shaped rails 5 by means of bearings 55A so that these rolls are positioned adjacent to the inner ends of the arms $6_1$ of the E-shaped rails 6 when the original carriage 2 is extended outwardly of the machine housing 1 as shown by solid lines in FIG. 2. The rollers 54 are mounted in such a relationship that the arms $6_1$ bear against the rollers 50, which in turn bear against the arm $5_1$. The plane $f$—$f$ of that surface of the arm $5_1$ which is opposed to the roller 50 and the planes $g$—$g$ and $h$—$h$ of the surfaces of the arm $6_1$ which are opposed to the rollers 50 and 54 are parallel to one another. Similarly, the plane $i$—$i$ of the surface of the arm $5_2$ opposed to the roller 52 and the plane $j$—$j$ of the surface of the arm $6_2$ opposed to the roller 52 are parallel to each other. The retainer 49 is prevented from slippage by a stop pin 55B.

When the original carriage 2 is moved forwardly or rightwardly from the position shown in FIG. 2, the E-shaped rails 6 of the carriage slide along the fixed Y-shaped rails 5 of the machine housing with the aid of the rollers 50 and 52. The rolling movement of the rollers 50 and 52 causes the retainer 49 to follow the movement of the carriage 2 by half the distance over which the carriage 2 travels. In this case, rollers are between the Y-shaped and E-shaped rails 5 and 6 which in turn are pressed by the rollers 54, and these slide mechanisms are parallel to each other longitudinally of the machine housing, so that the carriage 2 can achieve a very smooth horizontal movement without any lateral and vertical vibrations.

When the original carriage 2 is extended outwardly of the machine housing as shown by the solid lines in FIG. 2, the inner ends of the arms $6_1$ of the E-shaped rails 6 are pressed by the rollers 54 and the E-shaped rails 6 overlap the Y-shaped rails 5 with the rollers 50 and 52 therebetween, over a length exceeding about half the length of the carriage 2, whereby the carriage 2 may be supported sufficiently stably even in a cantilever fashion. This eliminates the need to make the housing rails long enough to be normally projected outwardly of the machine housing as in the prior art, and the housing rails only require a length substantially equal to the length of the upper surface of the machine housing. Also, the location of the original carriage on top of the machine housing within the confinement thereof means a great convenience in packing the apparatus for shipping and a reduced cost of manufacture and assembly because the dimensions required by the package substantially correspond to the size of the entire apparatus.

Even if the carriage 2 should be inadvertently raised by the operator when it is in its extended position as shown in FIG. 2, the carriage may be safely supported by the rollers 50 and 52 with the rollers 54 as the fulcrum. In order to ensure a safer support of the entire apparatus, it is desirable to provide an upward projection $6_3$ in the lower end of each E-shaped rail 6 so as to serve as a stopper bearing against the underside of the arm $5_1$ of each Y-shaped rail 5.

The construction of the slide mechanism, which comprises Y- and E-shaped rails 5 and 6, retainer 49 and rollers 50, 52 and 54, allows all the roller-engaging surfaces to be flat, and this ensures a sufficiently great length of the line of contact between the rails and the rollers, which in turn means a great facility in designing and fabrication as well as a reduced non-uniform abrasion and accordingly a greater durability. Thus, the materials forming the described embodiment may be soft materials such as aluminum for the rails and resin for the rollers, resulting in a sufficient durability and an economical advantage.

Figure 12:
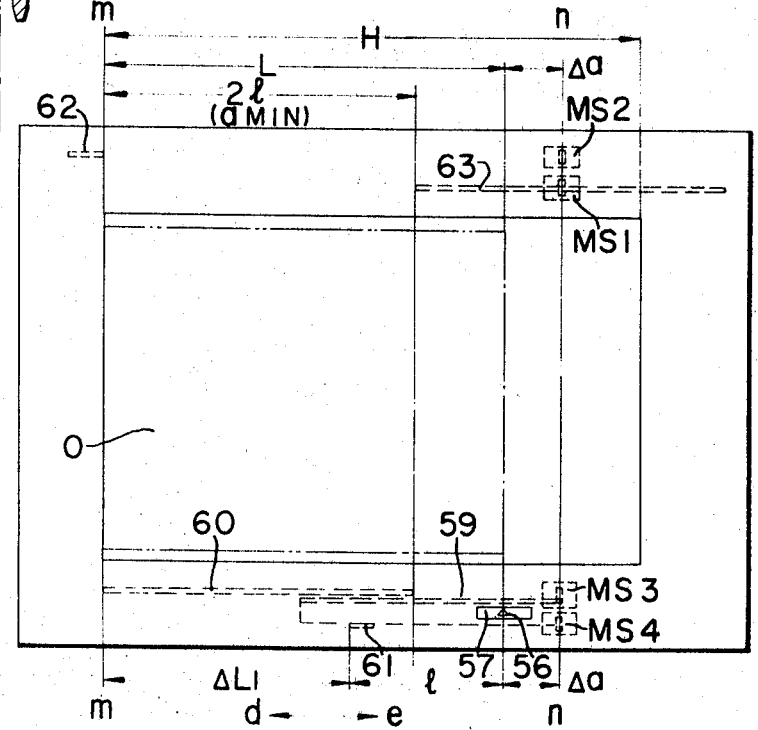
FIGS. 12 and 13 are schematic views showing the cam arrangement in the original carriage.
Figure 11:
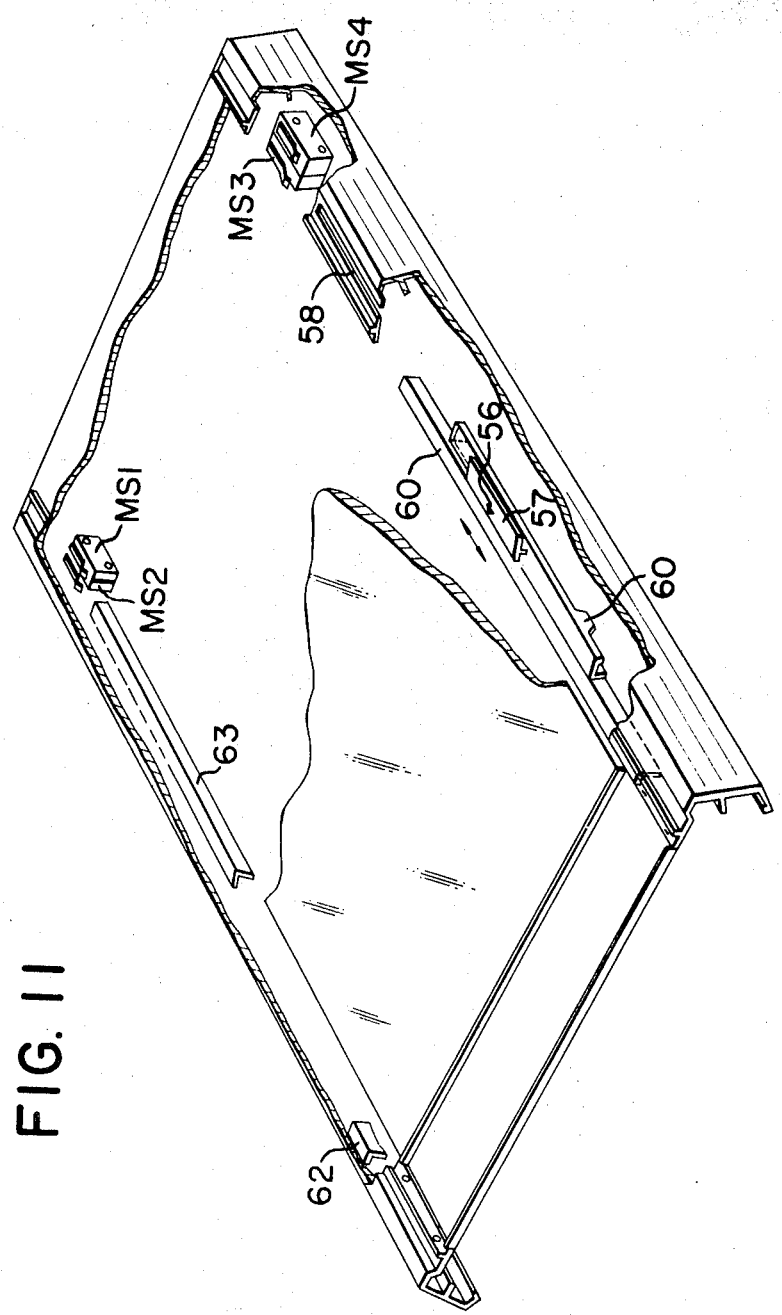
FIG. 11 is an enlarged perspective view showing the original carriage and its control means.
Figure 13:
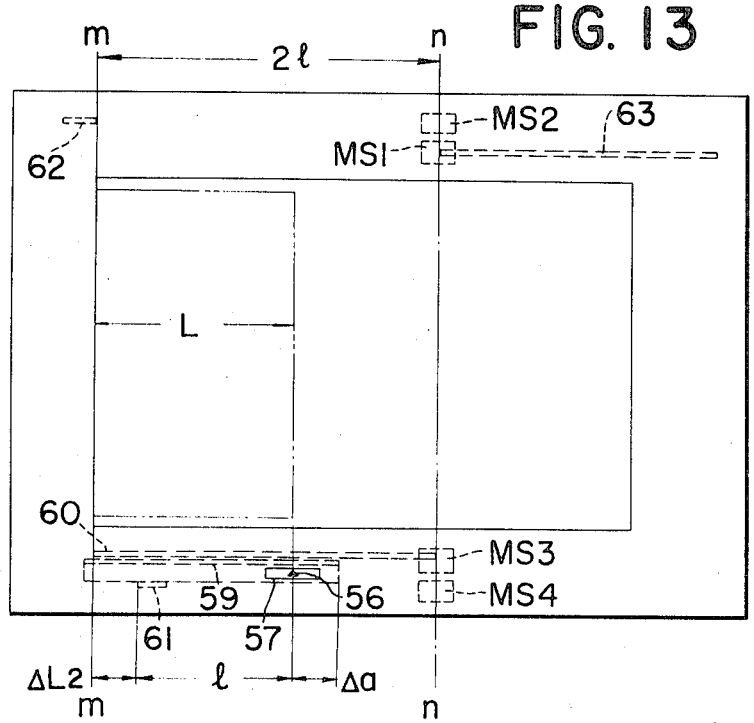

FIGS. 11 to 13 show an example of cutter means for cutting copying medium fed in synchronism with the movement of the original carriage and control means for the cutter means. The copying medium in use may preferably be in the form of a roll which may be random-cut in accordance with the length of the original to be copied.

As is apparent from FIG. 2, the roll of copying medium is fed during the forward stroke of the original carriage 2 and, when the leading edge of the copying medium reaches the entrance of the exposure means 25 through the electrically charging means 24, the original carriage 2 turns into its backward stroke. Thereupon, the illuminator lamp 8 is turned on to illuminate the original retained by the keep plate 4 on the glass sheet 3 of carriage 2 from therebelow, and the light carrying the image of the original is directed by the optical system comprising mirrors 11 and 13 and in-mirror lens 12 to effect a through-slit exposure on the copying medium moving through the exposure means 25. The speed of the original carriage in its backward stroke is limited by the exposure speed, whereas the forward stroke of the carriage has no speed limitation and can be $n$ times faster than the backward stroke so as to achieve high-speed copying operation. As an example, the case where the forward stroke is twice as fast as the backward stroke will be described hereunder.

The copying medium P from a supply roll is nipped between transport rollers 16 at the inlet of the machine housing 1 and passed through cutter means 15 into the nip between transport rollers 17, whereafter the copying medium is further passed through transport rollers 18 to 23.

After the exposure process has begun, the copying medium P in the web form is cut into a length corresponding to the length of the original by the cutter means 15, and the sheet of copying medium thus provided is subjected to subsequent processes while the feeding of the web from the supply roll is stopped until the next feed signal is produced. At this point of time, the leading edge of the roll of copying medium rests at the cutter means or a microswitch disposed for stopping the feed of copying medium.

During the forward stroke of the original carriage 2, the copying medium P is fed by a length $l$ which corresponds to the distance from the cutter means 15 to the exposure means 25. Since this rate of feed equals the exposure speed, the carriage 2 moves forward at least a distance $2l$ during that while, as shown in FIG. 13, so as to assume its backward stroke to effect the exposure process.

In a continuous copying operation, the distance $a$ over which the original carriage 2 travels for reciprocation varies with the length L of the original to be copied. The maximum distance $a_{max}$ over which the carriage travels is the sum of the length H of the glass sheet 3 (maximum copy size) and the width $\Delta a$ of the exposure slit, and the minimum distance of travel $a_{min}$ is $2l$.

If the length L of the original to be copied is greater than $2l - \Delta a$, the carriage 2 will travel a distance of $L + \Delta a$ during its reciprocation and the copying medium will be cut into a length equal to the length L of the original. If the length L of the original is greater than $l$ and smaller than $2l - \Delta a$, the carriage 2 will travel the minimum distance $a_{min}$ independently of the length of the original but the copying medium will be cut into the same length as the original.

The principle of operation will now be described. FIG. 12 shows the cam arrangement in the original carriage 2. To achieve the above-described reciprocation of the carriage and the random-cutting of the web of copying medium, the present invention employs a size adjusting knob 57 having a reference mark 56, the knob 57 being slidably received in a groove 58 for movement in parallel to the movement of the carriage 2. An original 0 is placed on the glass sheet 3 of the carriage 2 in such a manner that the left edge of the original is in accord with a reference line $m-m$ as viewed in FIG. 12. A first cam 59 for stopping the backward movement of the carriage 2 is provided for sliding movement with the knob 57, and this cam extends in the direction $e$. It should be noted that the cam 59 has its forward (rightward) end portion projected forwardly of the reference mark 56 of the knob 57 by a distance $\Delta a$ corresponding to the width of the exposure slit. In FIG. 12, the forward extremity of the first cam 59 is in accord with the line $n-n$. A second cam 60 for stopping the backward movement of the carriage 2 is fixed to the carriage 2 adjacent to the first cam 59, and its forward (rightward) end lies at a distance $a_{min}$ from the reference line $m-m$ of the original 0. There is further provided a cutting cam 61 which is integral with the knob 57 and the first cam 59, and the backward (leftward) extremity of the cutting cam 61 is at a distance $l$ in the direction $d$ from the reference mark 56. A cam 62 for starting the backward movement of the carriage 2 is fixed to the carriage at the opposite side thereof, and the forward operating end of this cam 62 is positioned on the reference line $m-m$. Also fixed to the carriage 2 is a feed cam 63 whose rearward (leftward) operating end is at a distance $2l$ from the forward end of the cam 62. The feed cam 63 is elongated in the direction $e$, and its rearward end may act on a corresponding microswitch MS1 to maintain it in open position even when the carriage 2 is in its maximum backward stroke.

Microswitches MS1 to MS4 corresponding to the respective cams are provided on the machine housing at suitable points on the line $n-n$.

In FIG. 12, the original 0 placed on the original carriage is shown to have a length greater than $2l - \Delta a$ and the reference line $m-m$ is that for such size of the original. From this position the carriage 2 starts its forward stroke at a speed twice faster than the rate of feed of the copying medium, so that the rearward or leftward end of the cam 63 is disengaged from the corresponding switch MS1 to allow the initiation of the feed of the copying medium.

The original carriage 2 continues to move forward to cover the distance $1l_2$ and reaches the line $n-n$ on which the switches are disposed, whereupon the cam 62 for starting the backward stroke actuates the microswitch MS2, which in turn operates an electric reversing circuit or a mechanical reversing mechanism for the carriage driving motor to turn the carriage 2 into its backward stroke. By that time, the leading edge of the copying medium has advanced a distance $l$ to reach the entrance of the exposure means.

During the aforesaid forward stroke, the cams 59 and 60 actuate the switch MS3 while the cam 61 actuates the switch MS4, whereas the control circuit is maintained inoperative and it is operative only during the backward stroke of the carriage 2.

Thus, the carriage 2 now starts to move backwardly and, when it covers a distance $\Delta L$, i.e., $L - l$, the rearward or leftward end of the cutting cam 61 actuates the switch MS3 to operate the cutter means 15, which thus cuts the copying medium into a sheet having a length $f + \Delta L_1$ corresponding to the length L of the original.

The carriage 2 continues to move backward to cause the forward or rightward end of the first cam 59 to disengage the switch MS3, thereby stopping the backward movement of the carriage 2. In the case of a continuous copying mode, the carriage 2 will immediately resume its forward stroke, whereas in the case of a single-cycle copying mode the carriage 2 will remain stopped in that position.

It is now assumed that an original whose length L is greater than $2l - \Delta a$ has been copied and then that original replaced by a smaller-size original whose length L shorter than $2l - \Delta a$, whereafter the knob 57 has been adjusted to the forward edge of the new original and the copying operation has been started. Then the carriage 2 will move forward from the aforesaid position to cause the cam 63 to disengage the switch MS2 to thereby allow the feed of the copying medium in the web form, whereafter the cam 62 actuates the switch MS2 to turn the carriage 2 into its backward stroke and start an exposure process.

When the backwardly moving carriage 2 covers a distance $\Delta L_2$, the rear or left end of the cutting cam 61 actuates the switch MS3 to allow the web of copying medium to be cut into a sheet having a length $f + \Delta L_2$ which equals a length L of the new original.

Unlike the previous case where the carriage 2 continues its backward movement to cover a distance $L \geqq 2l - \Delta a$, the carriage in this case will pass the first stop cam 59 and move further backward until the second cam 60 is disengaged from the switch MS3. If the copying operation is of a continuous mode, the carriage will immediately resume its forward stroke, whereas if the copying operation is of a single-cycle copying mode the carriage will remain stopped in that position.

As has been described hitherto, the electrophotographic copying apparatus with a reciprocating carriage according to the present invention employs a group of cams and associated group of switches together with a reference mark for the varying original size. Thus, whether the original in use has a length shorter than $2l - \Delta a$ which is the maximum size available for the conventional apparatus or a length greater than $l$ which is the minimum size available for any apparatus, the copying medium in the form of a roll can be cut into sheets having a length equal to the length of the original and all the web can be used effectively without unnecessary waste. Of course, there is no need for the operator to cut the copying medium by adjusting it to the size of the original after the copying operation has been done.

Figure 14:
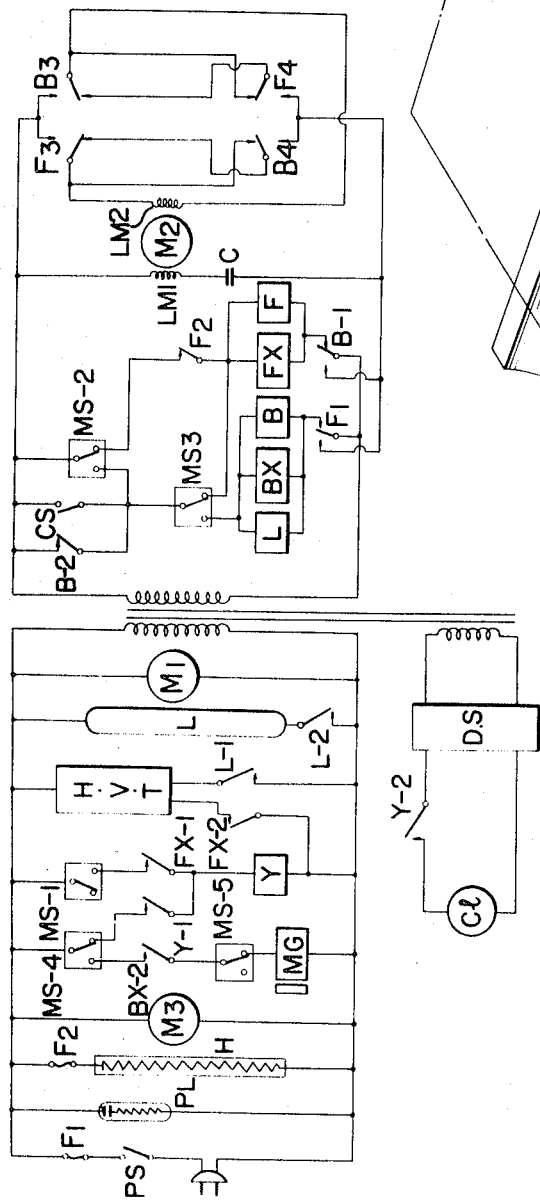
FIG. 14 is a block diagram of the electric circuit according to an embodiment of the present invention.

FIG. 14 shows an example of the drive circuit for the above-described original carriage. Closing of a power switch PS causes energization of a pilot lamp PL, a motor M1 in the constantly driving system, a motor M3 for stirring the developing liquid, and a heater H in the fixing means. By closing a copy switch CS, there is formed a circuit of copy switch CS — microswitch MS3 — contact B-1 of relay F (FX), so that relays F and FX are energized. Thus, even if the copy switch CS is opened, this circuit will self-hold with the aid of a bypass provided by microswitch MS2 — contact F2. On the other hand, in the circuit of the carriage driving motor M2, contacts F3 and F4 of the relay F are closed to supply a power from a power source to the circuit of contact F3 — coil LM2 — contact B3 — contact F4 — contact F1 to thereby rotate the motor M2, which will thus drive the original carriage 2 for its forward stroke. Concurrently therewith, a high voltage transformer HVT will be excited to start the electric charging of the copying medium.

As the original carriage 2 moves forward, the microswitches MS1–MS4 are actuated by the corresponding cams attached to the carriage 2 so as to control various parts in a sequence described hereunder. As soon as the carriage 2 begins to move forward, the microswitch MS3 changes over from its normally closed position to its open position. The open position of this microswitch is maintained until the original carriage 2 completes its one reciprocation. Subsequently, the copying medium feed microswitch MS1 is closed to energize a relay Y through the contact FX-1 of the relay FX. The relay Y self-holds with the aid of its contact through the normally closed contact of the microswitch MS4 while the contact Y-2 of the relay Y is closed to energize the feed clutch C1. The microswitch MS2 for changing over the original carriage from the forward to backward stroke is then closed and relays F and FX are deenergized, whereupon relays B, BX and L are energized through the respective normally open contacts of the microswitches MS2 and MS3 so that these relays self-holds with the aid of the contact B-2 of the relay B. Simultaneously therewith, the carriage driving motor M2 is caused to reverse its rotation through the contacts B-3 and B-4 of the relay B. Further, the illuminator lamp 16 is turned on and, instead of contact FX-2, contact L-1 is now closed to maintain the energization of the high voltage transformer HVT.

Upon reversal of the motor M2, the carriage 2 turns into its backward stroke. Nothing is affected thereby other than the microswitch MS1, which is changed over from its closed position to its open position.

Thereafter, the microswitch MS4 is closed for a certain time (about 0.2 second), whereupon the relay Y is deenergized and at the same time the feed clutch C1 is deenergized to stop the feed of the copying medium while solenoid MG is energized to operate the cutter means 15 to cut the copying medium. Subsequently, the microswitch MS3 is opened to deenergize relays B, BX and L with their respective contacts opened, thereby deenergizing the motor M2, illuminator lamp 16 and high voltage transformer HVT. Thus, the original carriage 2 terminates its one cycle of reciprocation.

To produce a number of copies, only one depression of the copy switch CS is required to operate the carriage continuously until the last cycle of reciprocation is completed for the last sheet of copying medium.

Figure 16:
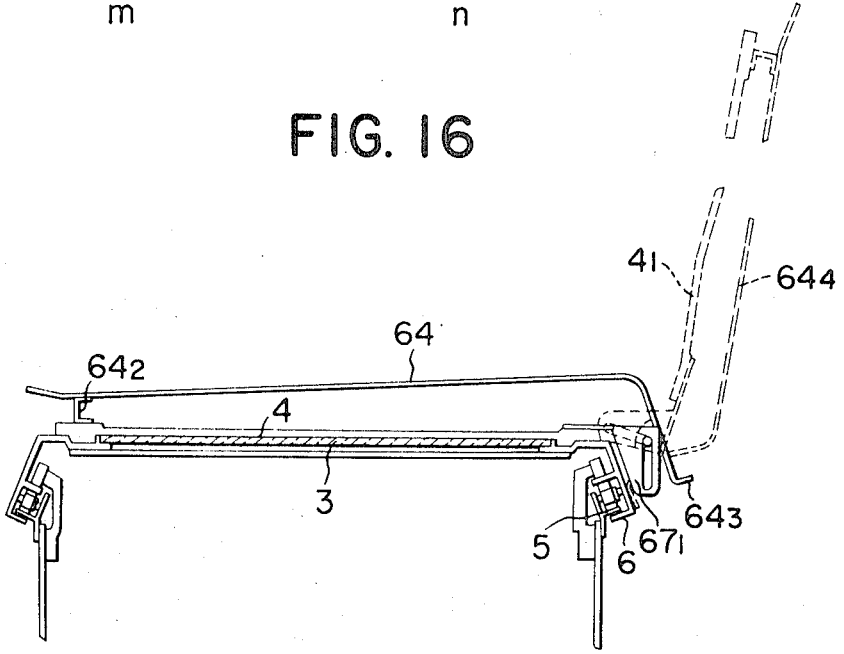

Referring to FIGS. 15 to 17, there is shown an example of the original keep plate mounted on the original carriage 2. This keep plate is simple in construction and readily and reliably enables the replacement and positioning of originals to be copied.

As shown, a V-shaped arm 64 strides over the original keep plate 4 which is formed of a flexible sheet, and the arm 64 has its diverged ends $64_1$ pivotally connected to the original carriage 2 by means of fitting 65 and shaft 66 (FIG. 17), while the free end $64_2$ of the arm 64 is suitably secured to the keep plate 4 (FIG. 15). The keep plate 4 is engaged with the shaft 66 and connected to a fitting 67 which is vertically movable with the aid of an elongated slot 68 formed therein. In order to prevent the deviation of the original which might result from a fine displacement of the keep plate 4 caused by a shock imparted thereto during the change-over of the carriage 2 between the forward and backward strokes, the arm 64 and the keep plate 4 may preferably be engaged with the carriage 2 at several locations. The arm 64 has stopper means $64_3$ formed at the pivoted end portions thereof for maintaining the arm in its raised position.

To change the original or to set the original in position, the arm 64 is manually raised or opened to the position indicated by imaginary lines in FIG. 16, and maintained in that position with the aid of the stopper means $64_3$, whereby the keep plate 4 formed of a flexible sheet such as rubber, resin or the like is raised with the arm 64. Thus, the change or positioning of the original on the carriage 2 can be readily and reliably accomplished.

Subsequently, the keep plate 4 is lowered or closed by means of the arm 64 to cover the original on the carriage, the hinged side of the keep plate 4 is limited in motion by fitting 67, slots 68 and shaft 65, and due to the gravity of the keep plate 4, the end $67_1$ of each fitting 67 falls along the sloped surface $6_4$ of the angle 6 forming part of the carriage, so that the keep plate 4 falls substantially vertically on the glass sheet 3 while generally maintaining a horizontal position. Thus, the original on the glass sheet 3 is prevented from any deviation.

In case the original to be copied is a book or other thick object, if the thickness of such object is less than the length of the slot 68 formed in each fitting 67, the keep plate 4 will fall substantially vertically on the original while maintaining a horizontal position, whereby the keep plate 4 will cover the original without displacing the latter and accordingly dislocating the original once set in position. Also, the flexible material forming the keep plate 4 ensures its side edges to intimately contact the carriage 2, thus preventing the leakage of light from the inner illuminator lamp which would adversely affect the sight of the operator. A further advantage is that even a very large original can be copied with the keep plate maintained in its raised position by means of the stopper means $64_3$.

Preferably, the arm 64 may take the form of a gate or an arch and its free end $64_2$ may have a shape of T, L or the like and a suitable width. The fixed connection between the free end $64_2$ of the arm 64 and the flexible keep plate 4 may be achieved by the use of an adhesive or a screw.

OPTICAL SYSTEM

Figure 3:
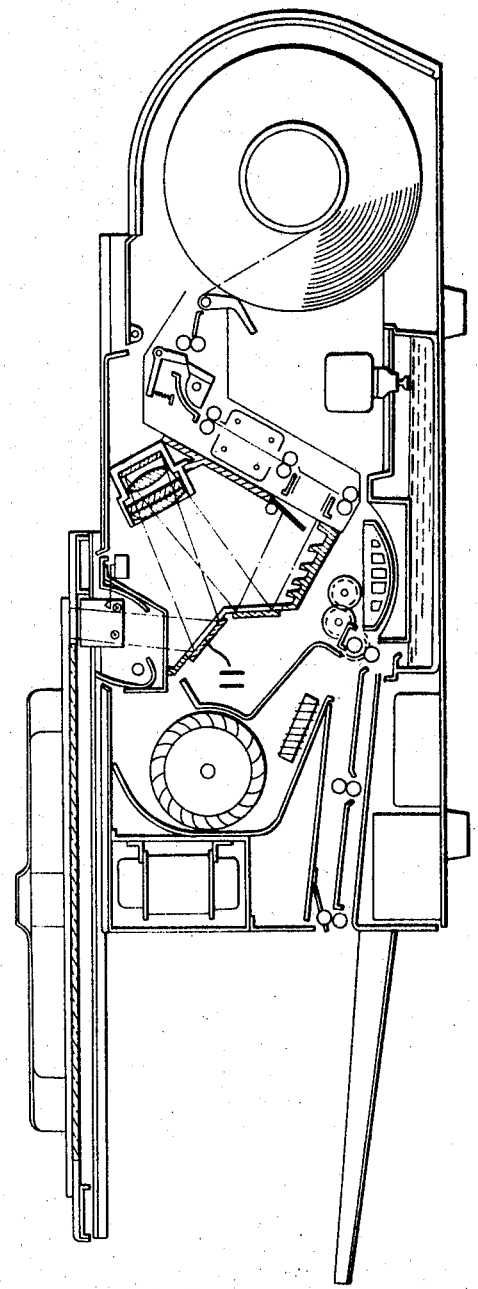
FIG. 3 is a view similar to FIG. 2 but showing another embodiment of the optical system.

An embodiment of the optical system according to the present invention is shown in FIGS. 2 and 3. The optical system includes an in-mirror lens 12 and two mirrors 11 and 13, which are arranged such that the image of the original illuminated by the illuminator lamp is reflected by the mirror 13 and directed to the in-mirror lens 12, where the image light is reflected to reach the mirror 11 for further reflection and projected for image formation on the copying medium in the exposure means. This configuration provides a folded light path which substantially constitutes a star optical system.

In the star optical system, the acute angle $a$ between the plane X—X of the original and the exposure plane Z—Z is selected to about 60°, the optic axis L—L of the in-mirror lens 12 is substantially in accord with the mid-line, i.e., 30° in the angle $a$, and the mirror 11 is disposed substantially in a plane parallel to the line Y—Y vertical to the plane X—X. Thus, the mirror 13 is disposed substantially in a plane parallel to the line Z' perpendicular to the exposure plane Z—Z, so that the point of intersection O between the planes of mirrors 11 and 13 lies on the optic axis L—L of the in-mirror lens 12 and is disposed substantially at the center of an equilateral triangle $abc$ whose side is as long as the distance between the points of intersection $a$ and $b$ between the exposure plane Z—Z and the plane X—X and the vertical Y—Y.

In this way, the plane X—X of the original and the exposure plane Z—Z are at an angle of about 60°, the optic axis L—L of the in-mirror lens 12 is at about 30° with respect to the foregoing two planes, and the mirror 11 is substantially at a right angle with respect to the plane X—X. Also, the optic axis L—L of the lens 12 is at about 60° with respect to the vertical Z' to the exposure plane Z—Z. The angle of intersection between the mirror 11 and the mirror 13 is about 120°.

The fact that the plane X—X of the original, exposure plane Z—Z and the optical elements 11–13 are in a simple angular relationship with one another such as 30° or its multiples leads to a great simplicity of design, fabrication and assemblage as well as a great ease to manufacture jigs.

Since the in-mirror lens 12 is downwardly inclined about 30° with respect to the plane X—X of the original and the mirror 11 is substantially vertical to that plane, these two optical elements are substantially free of dust or other foreign substances which would otherwise tend to stick thereto. With the exception of the mirror 13 facing upwardly, the dust-proof arrangement of the in-mirror lens 12 and mirror 11 plays a very important role in the electrophotographic copying apparatus with which the scattering of toner is usually the case. It is essential to construct the optical system in a dust-proof manner because the operator of the copying apparatus is usually a layman who would find it difficult to effect the maintenance and inspection of such optical system.

Further, as a result of the approximately 60° inclination of the exposure plane Z—Z with respect to the original plane X—X, the means for feeding copying medium to the electrically charging means 24 overlying the exposure means 25 is disposed in the upper portion of the machine housing, and this provides a ready access to the feed and cutter means for their inspection and maintenance simply by opening the top cover of the machine housing in a copying apparatus of the type using a roll of copying medium P which is automatically cut into sheets of desired lengths by the cutter means 15, as shown in FIG. 2. Thus, the entire apparatus construction may be very much simplified as compared with the conventional copying machines of the type in which various processing means such as feeder, charger and exposure means are disposed at the bottom of the machine housing and weighty components such as optical system and cooling means disposed in the upper part of the machine housing must be dismounted or opened for the purposes of interior inspection or maintenance.

In addition, since the path of copying medium follows an obliquely downward direction, there is provided a smooth passage of such medium which passes below the optical system into the liquid developing means 26 disposed at the bottom of the machine housing, and the possibility of the copying medium jamming in the apparatus is greatly reduced.

Furthermore, a triangular space provided behind the exposure plane Z—Z, i.e., behind the exposure means 25 and electrically charging means 24, may be utilized to accommodate therein such means as developer supply tank 70 and automatic supply valve to compensate for the fast consumption of the developer which is usual with a high-speed copying apparatus. Substantial spaces are also provided on the opposite sides of the optical system and, if required, such spaces may be utilized to contain further supply tanks therein. Between developing means 26 and tank 37 there may be provided an automatic developer circulating mechanism, not shown.

The point of intersection 0 between the optic axis L—L of the in-mirror lens 12 and the planes of the mirrors 11 and 13 is disposed substantially at the center of the equilateral triangle $abc$, as described above, and this means a compact arrangement in that the optical system, exposure means 25, electrically charging means, etc. together occupy only half the entire triangular space. Also, optical accuracy can be attained by stably journalling the transport rollers 16–19 to the optical system supporting frame or generally rigid frame formed of casting.

The other half of the triangular space $abc$ may be used to provide a large-size cooling means 29 for cooling the air heated by the illuminator lamp 8 and directing it through duct $7_1$ to fixing means 27 disposed down-stream of the developing means 26. As a result, temperature rise within the apparatus may be prevented and the developing means 26, supply tank 70, exposure means 25 and electrically charging means 24, all of which should desirably be protected against heat, may be advantageously affected as if they were all isolated from the source of heat.

The possibility of the optical system and some other means being accommodated in a half of the machine housing connotes that the space required for reciprocating the original carriage 2 can be substantially within the confinement of the top of the machine housing, and this in turn leads to an advantage that the guide rails need not be projected outwardly of the machine housing to form an undesirable obstruction not only in use but also in packing and shipping of the apparatus.

Figure 18:
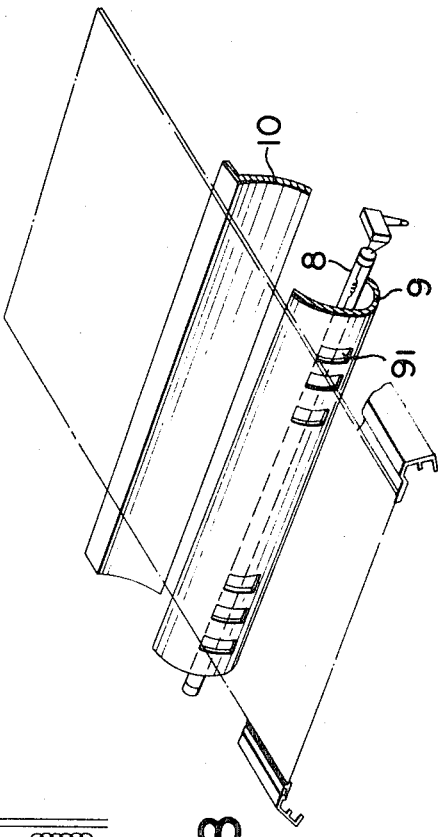
FIG. 18 is a perspective view for illustrating the arrangement in the neighborhood of the original illuminator lamp.

FIG. 18 shows means for uniforming the intensity of light passing longitudinally of the exposure slit when the original is illuminated by the illuminator lamp 8 and for cooling the copied surface of the original to enhance the image fixing efficiency. A reflector 9 for the illuminator 8 is formed with through-apertures $9_1$ for controlling the amount of reflection to uniform the intensity of light in the longitudinal direction of the exposure slit. The apertures $9_1$ may be shaped and arranged in any desired manner, but these apertures should advantageously be such that those in the center portion of the reflector where the intensity of light from the illuminator lamp is greatest are greater is size while those adjacent to the opposite ends of the reflector become smaller in size and that all these apertures are aligned axially of the reflector. Light emitted from the lamp 8 toward the reflector 9 reduces its amount of reflection by a decrement corresponding to the area of the apertures $9_1$. More specifically, the reduction in the amount of reflection is greater in the center portion of the reflector than in the opposite end portions of the reflector. As a result, the combined amount of light consisting of the non-reflected light passing longitudinally of the exposure slit and the reflected light by the reflector becomes uniform so that the surface of the original to be copied may be illuminated with a uniform intensity of light, which results in a uniform exposure achieved through the slit. Another reflector 10 may be similarly apertured to obtain the same result as described. In this case, the heated air in the neighborhood of the illuminator lamp 8 and the surface of the original being copied may be sucked into cooling means 29 through the apertures $9_1$ and the air thus sucked may be directed to the fixing means 27 to help the fixing effect of the copying medium which has arrived there through the developing means 26, so that the fixing effect may be significantly enhanced while the surface of the original may be rapidly cooled to prevent the original supporting glass sheet 3 from being deformed or otherwise damaged by heat. To further enhance the fixing effect, heater means may be provided in the duct.

The distance between the lower edges of the reflectors 9 and 10 determines the effective slit width for the slit exposure.

A folded light path provided by a W-shaped optical system as shown in the embodiment of FIG. 3 may be similarly effective.

COPYING MEDIUM FEED MEANS

Figure 19:
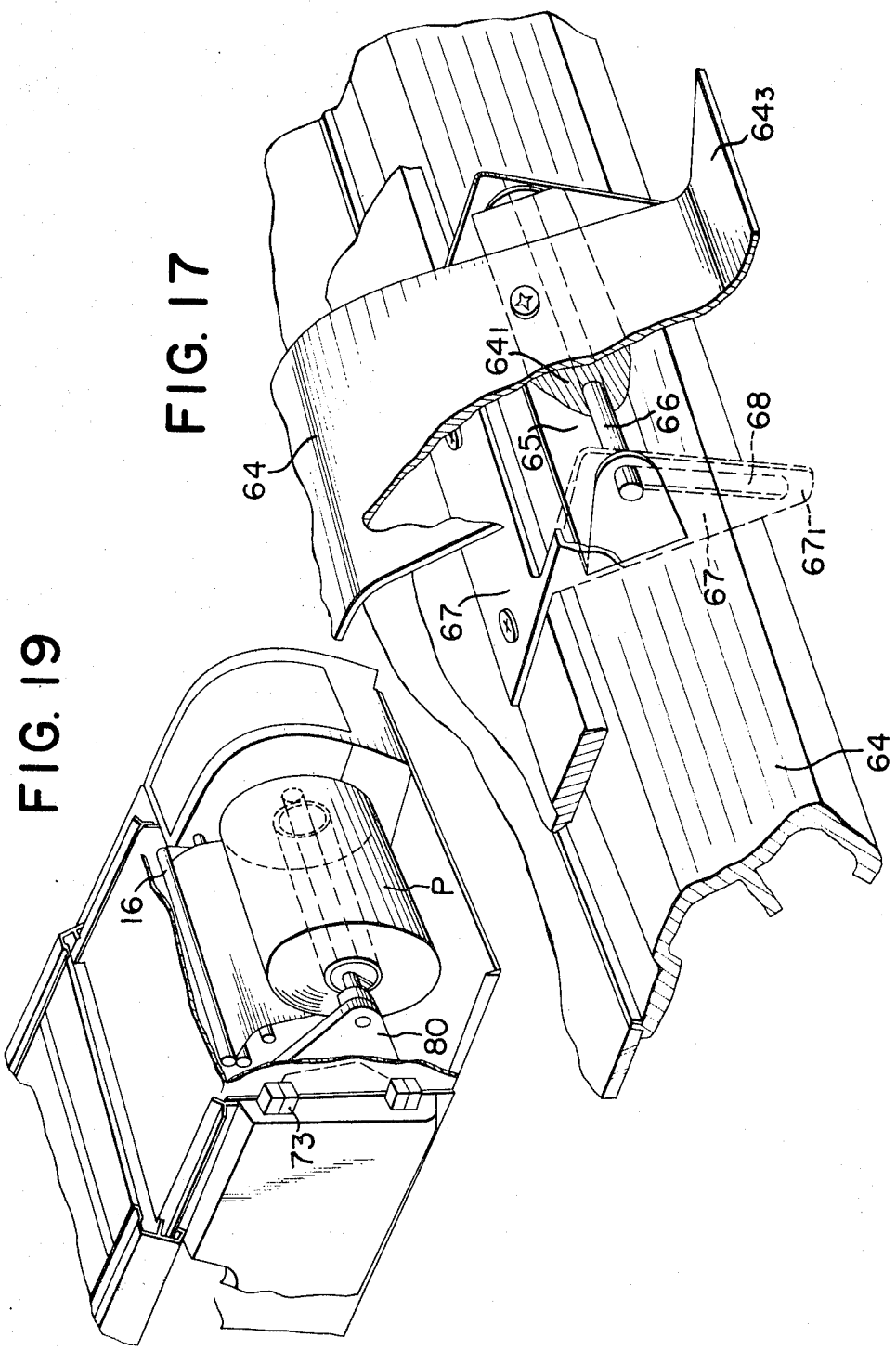
FIG. 19 is a fragmentary perspective view of an electrophotographic copying apparatus provided with loading means for a roll of copying medium.
Figure 20:
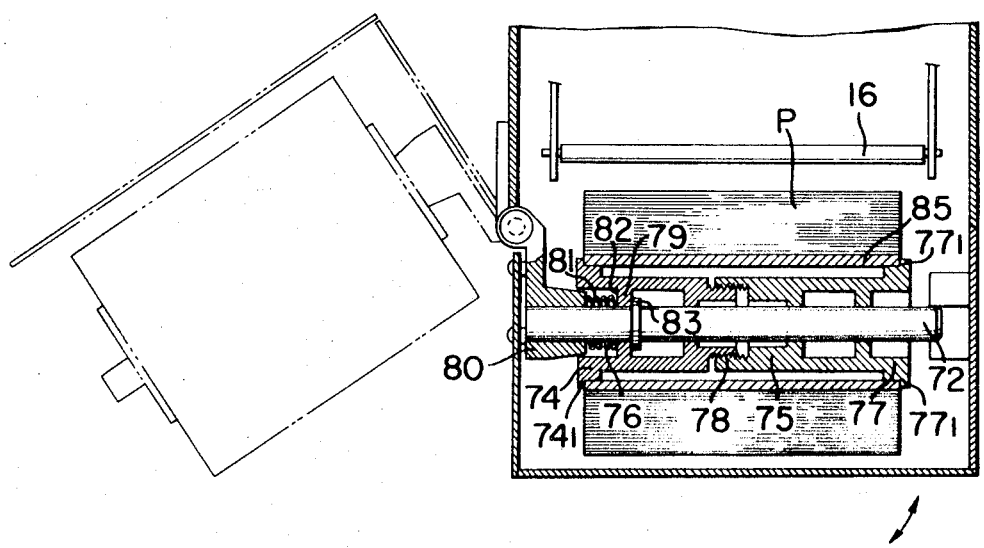
FIG. 20 is a vertical section of the means shown in FIG. 19.
Figure 21:
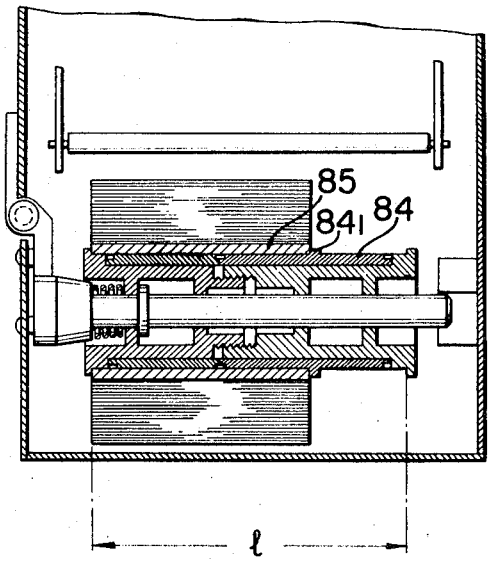
FIG. 21 shows, in vertical section, the same means loaded with a less wide roll of copying medium.

Referring to FIGS. 19 to 21, there is shown an example of the loading means for a roll of copying medium according to the present invention. A roll supporting shaft 72 has one end thereof removably supported by the machine housing and the other end or base pivotally connected to the machine housing by means of hinge 73. A spool assembly 75 comprising two spool sections 74 and 77 separably coupled together is mounted on the shaft 72 along the length thereof for holding the roll of copying medium. The spool section 74 adjacent to the base of the shaft 72 is restricted in axial displacement and a friction means 76 is disposed inwardly of the spool section 74 so as to provide a resistance to rotation of that spool section.

Although the spool 75 is shown as an assembly comprising two spool sections 74 and 77 separately coupled together by means of threads 78, the connection of these two sections may also be achieved by friction or other suitable means. Mounting of the spool section 74 with respect to the shaft 72 may advantageously be accomplished by an inwardly directed projection 79 extending from the inner side wall of the spool section 74 and a spring 81 and slip ring 82 interposed between the projection 79 and the boss 80 of the shaft 72 so that the projection 79 may be pressed against a stop ring 83 formed circumferentially of the shaft 72. In this way, axial displacement of the spool section 74 may be restricted effectively and frictional resistance to rotation thereof may also be provided.

To load up a roll of copying medium, the shaft 72 is pivoted about the hinge 73 in the manner as indicated by imaginary lines in FIG. 20, whereafter the outer spool section 77 is removed. Then a roll of copying medium P is mounted on the other spool section 74, to which the removed spool section 77 is again connected to form the spool assembly 75 with opposite flanges $74_1$ and $77_1$ restraining the roll of copying medium P at the opposite ends thereof. Subsequently, the spooled shaft 72 with the roll of copying medium P now held thereon is turned back into the machine housing and the free end of the copying medium P is nipped between feed rollers 16 provided in the machine housing. Thus, the loading operation is completed.

As has been described hereinabove, the roll supporting shaft 72 can be readily displaced out of the machine housing so as to readily enable a roll of copying medium to be mounted thereon and this is especially advantageous when the roll of copying medium is larger in diameter and accordingly heavier in weight. The fact that the roll of copying medium P is not directly mounted on the shaft 72 but indirectly on the spool 75 mounted on that shaft for restricted axial displacement contributes of necessity to the proper positioning of the roll of copying medium. In addition, the frictional resistance imparted to the spool 75 during the rotation thereof prevents any excess rotation of the spool 75 which would result from the inertia of rotation and would result in slack of the web between the roll and the feed rollers 16, and thus any disadvantage may be prevented such as deformation or bend of the copying medium which is attributable to the slack thereof.

FIG. 21 shows an example in which a roll of copying medium P having a smaller width $l_1$ is loaded by the use of a flanged auxiliary cylinder 84. The auxiliary cylinder 84 has its outer surface contacting the inner wall of a hollow core 85 for the roll of copying medium P. When two spool sections 74 and 77 are connected together to form a spool having a length $l$, the auxiliary cylinder 84 has such a length that the opposite ends thereof bear against spool flanges $74_1$ and $77_1$ respectively and that the intermediate portion of the auxiliary cylinder 84 fits the reduced portion of the spool 75, as shown. The auxiliary cylinder 84 has a flange $84_1$ formed at a location therein spaced apart from the spool flange $74_1$ by a distance corresponding to the width $l_1$ of the copying medium P. Thus, the roll of copying medium P having the small width $l_1$ may be positioned on the auxiliary cylinder 84 between the spool flange $74_1$ and the flange $84_1$ of the auxiliary cylinder 84.

The auxiliary cylinder 84 may be divided into a plurality of sections including a flanged one, so as to accommodate various widths of copying roll by suitably adjusting the location of the flanged section when the divided cylinder sections are assembled together.

Figure 22:
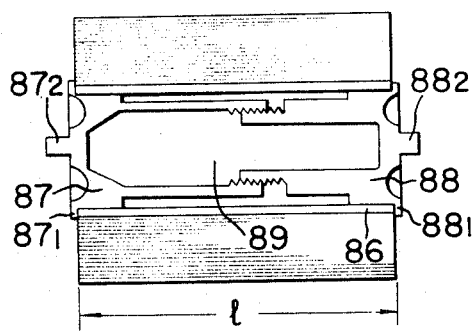
FIGS. 22 and 23 are cross-sectional views for showing examples of the means for holding a roll of copying medium.

Means for holding the roll of copying medium P will further be described. The shown example can hold a roll of a varying width and readily allows the mounting and dismounting thereof. FIG. 22 shows a case where a roll of copying medium P having a maximum width $l$ is held. In this case, two spool sections 87 and 88 are inserted into the hollow core 86 of the copying roll through the opposite open ends thereof and connected together to form a spool 89 in the hollow core 86 in such a manner that flanges $87_1$ and $88_1$ formed at the opposite ends of the spool 89 prevent the axial displacement of the roll. The spool 89 has outwardly projected shafts $87_2$ and $88_2$ formed at the opposite ends thereof which are rotatably received into unshown bearings provided on the machine housing. Thus, the roll of copying medium P may be rotatably supported on the spool 89.

Figure 23:
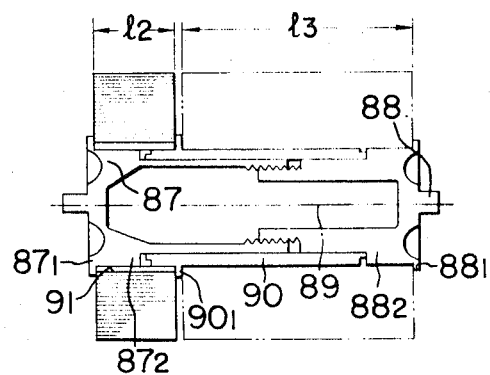

FIG. 23 shows a case where a roll of copying medium having a smaller width $l_2$ is held by the use of a flanged auxiliary cylinder 90. The auxiliary cylinder 90 has its outer surface in contact with the inner wall of the hollow core 91 for the roll of copying medium P. When two spool sections 87 and 88 are coupled together to form a spool 89 having a length $l$, the auxiliary cylinder 90 has such a length that the opposite ends thereof bear against spool flanges $87_1$ and $88_1$ and that the intermediate portion of the auxiliary cylinder 90 fits the reduced portion of the spool 89, as shown. The auxiliary cylinder 90 has a flange $90_1$ formed at a location therein spaced apart from the spool flange $87_1$ by a distance corresponding to the width $l_2$ of the copying medium P. Thus, the roll of copying medium P having the small width $l_2$ may be positioned on the auxiliary cylinder 90 between the spool flange $87_1$ and the flange $90_1$ of the auxiliary cylinder 90. This arrangement also enables a different roll of copying medium having a different width $l_3$ to be held on the auxiliary cylinder 90 between its flange $90_1$ and the opposite spool flange $88_1$.

As an alternative, the auxiliary cylinder 90 may be divided into a plurality of sections one of which has a flange $90_1$, so as to accommodate various widths of copying roll by suitably adjusting the location of the flanged cylinder section when the divided cylinder sections are assembled together. Although the spool 89 has been shown with opposite projected end shafts journalled to the machine housing, the spool 89 may alternatively be formed with end holes for receiving shafts inwardly projected from the machine housing, thereby supporting the spool.

According to such arrangement, the spool sections 87 and 88 can be simply inserted into the core of the copying roll through the opposite ends thereof and connected together therein, and this means a great facility to mount and dismount the spool with respect to the roll of copying medium.

Figure 24:
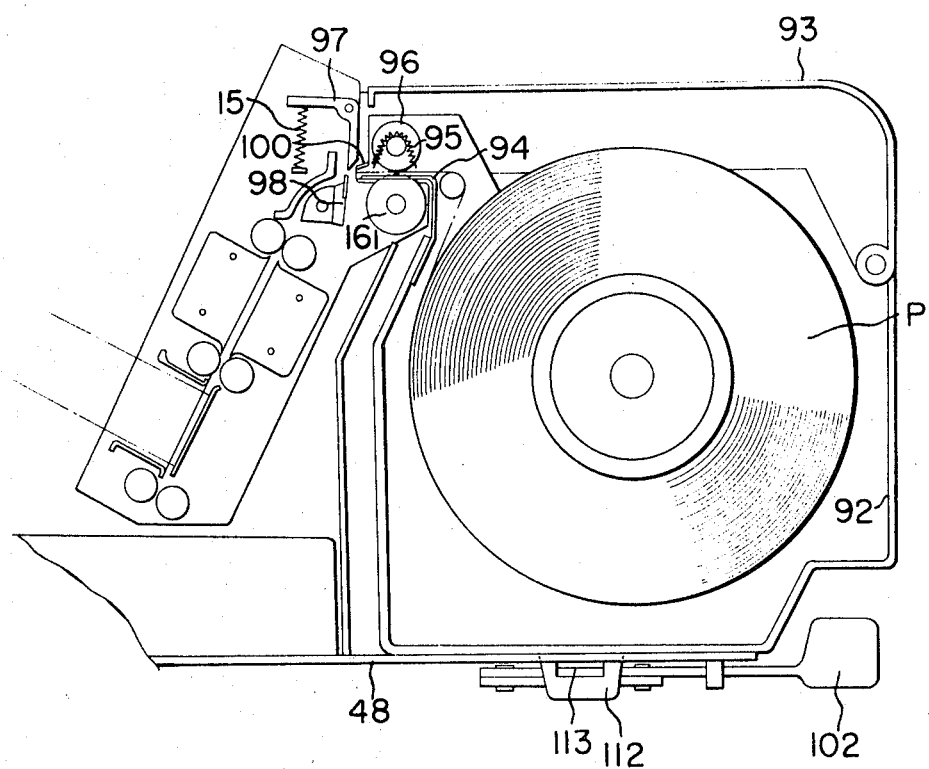
FIGS. 24 to 26 are enlarged sectional view, perspective view and plan view, respectively, of the loading means for a roll of copying medium in a cassette form.
Figure 25:
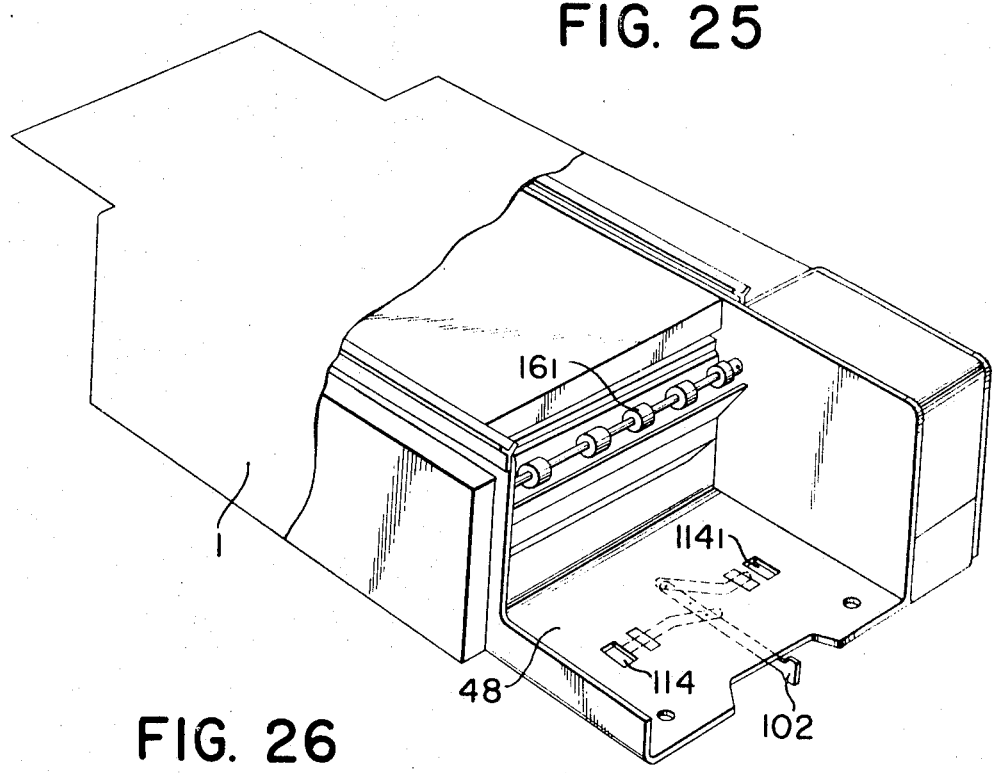

FIGS. 24 to 27 show an embodiment in which the roll of copying medium is loaded in the form of a cassette. In FIG. 25, a cassette 92 containing therein a roll of copying medium P is removably mounted within the machine housing 1. As shown in FIG. 24, the cassette 92 has a guide plate 94 engageable with a feed roller $16_1$ mounted on the machine housing, and a keep roller 96 urged into contact with the feed roller $16_1$ by a spring 95. The machine housing 1 has cutter means 15 including a fixed cutting edge 97, a rotary cutting edge 98 and its control means. The feed roller $16_1$ is intermittently driven from a driving motor M1 through chain 38, electromagnetic clutch C1 and sprocket 99. Thus, the feed roller $16_1$ is operatively connected to the apparatus driving system through sprocket 99 and clutch C1 and intermittently driven by a feed signal from the apparatus control mechanism. The rotary cutting edge 98 is rotated by a plunger MG to cut the copying medium P in response to a cutting signal transmitted from apparatus control mechanism in accordance with a predetermined length of the original to be copied.

Since the keep roller 96 forming one of the feed roller set is mounted to the cassette and driven by the feed roller $16_1$ mounted on the machine housing and forming the other of the feed roller set, there is no need to introduce the driving system into the cassette through gearing or the like and thus, the cassette becomes very simple in construction. When the cassette is removed, the leading edge of the copying medium P remains held between the keep roller 96 and the guide plate 94 to maintain the same position for feeding.

Since the two rollers $16_1$ and 96 forming the feed roller set are mounted on the machine housing and the cassette respectively as described above, the outlet portion of the cassette and the inlet portion of the machine housing are vertically offset from each other as shown in FIG. 24. In this case, the drive roller $16_1$ may underlie the driven roller 96.

By registering the leading edge of the copying medium P with the outlet of the cassette 92 after it is inserted into the cassette, that leading edge may be substantially registered also with the cutting edges 97 and 98 so that the operation can immediately be started without the need to move the leading edge to the cutter means in the apparatus body after the cassette is inserted.

When the copying medium is fed from the supply roll into the apparatus through the set of rollers $16_1$ and 96 and along the guide plate 100 so as to be cut into a sheet in accordance with the length of the original being copied, the line along which the medium is cut is substantially registered with the outlet of the cassette. Thus, if the cassette 92 must be replaced by another cassette containing a roll of copying medium corresponding to the size of a subsequent original to be copied, the cassette 92 may be removed immediately. In this case, the leading edge of the copying medium in the cassette 92 is only slightly exposed out of the outlet and any stains or wrinkles which may later be formed at such exposed portion of the copying medium will be negligible.

There is thus provided a simple construction in which the cassette has only a single keep roller instead of two feed rollers and no particular means is required to properly position the leading edge of the copying medium P when the cassette is inserted or removed, whereby the roll of copying medium P can be mounted and dismounted with great ease and rapidity and also can be used effectively without unnecessary waste of the material.

Figure 27:
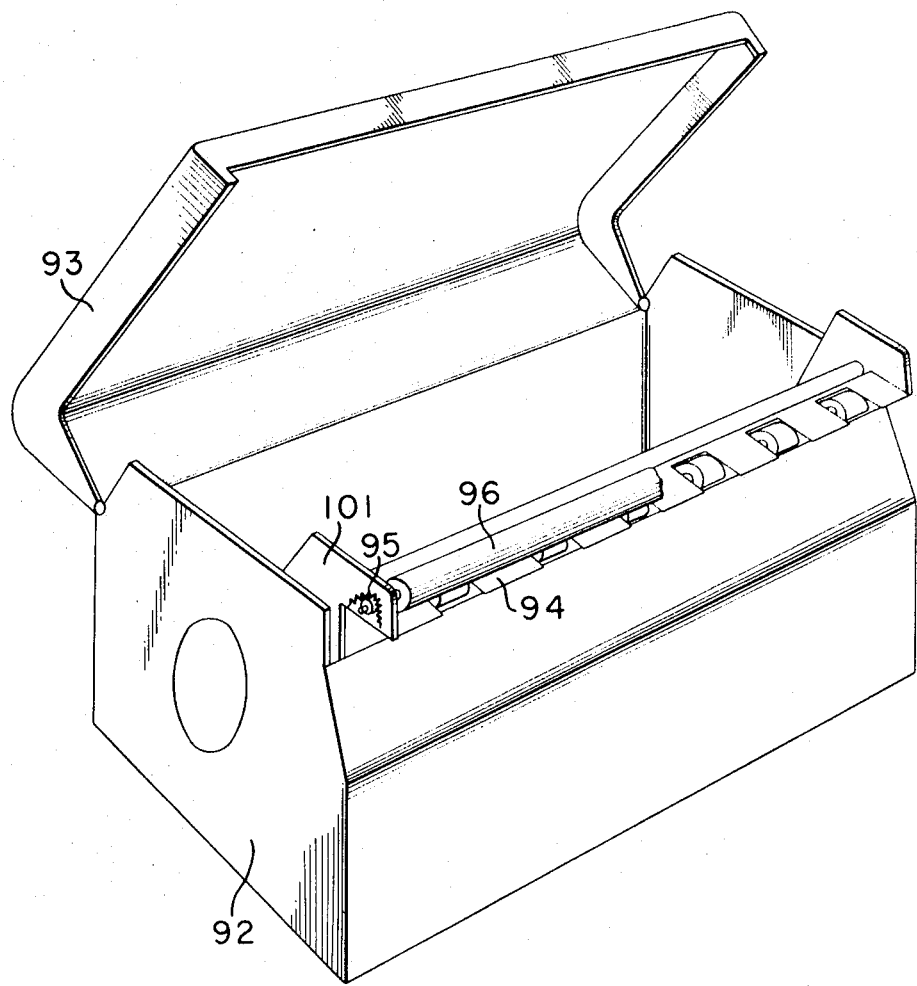
FIG. 27 is a perspective view of the cassette.

In the shown cassette 92, the other portions than those described with respect to FIG. 24 may be arranged suitably as desired. For example, as shown in FIG. 27, the cassette 92 may have an openable lid 93 and end plates 101 for receiving the shaft of the keep roller 96.

Figure 28:
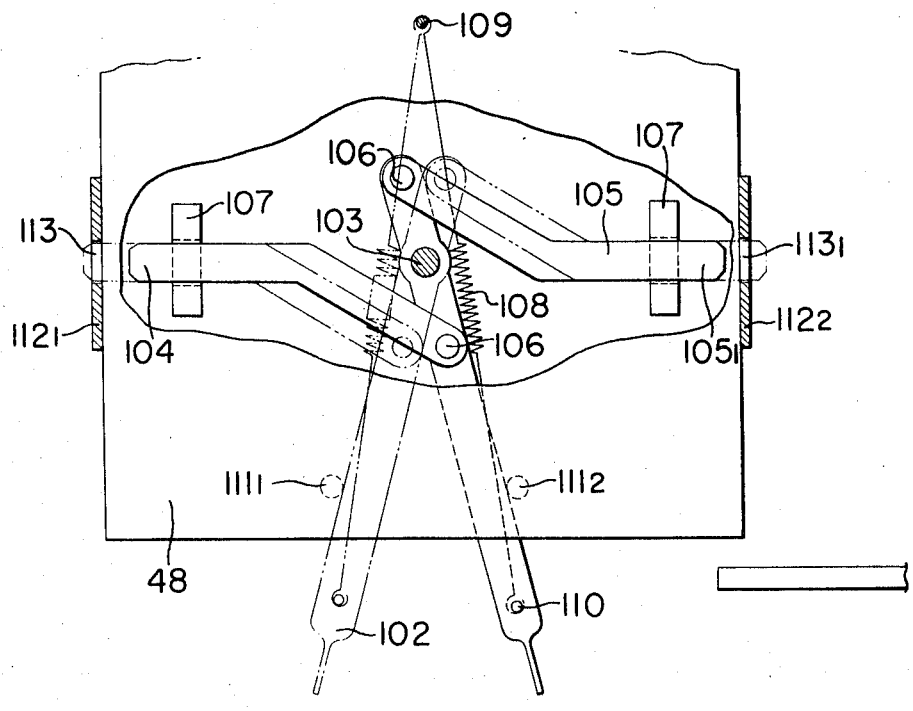
FIG. 28 is a horizontal sectional view of the means for immovably retaining the cassette to the machine housing.

FIG. 28 particularly shows an example of means for retaining the cassette to the machine housing. As seen in FIG. 28, on the underside of the bottom plate 48 of the machine housing 1, a lever 102 is pivotally mounted by means of shaft 103 and clamp arms 104 and 105 are disposed parallel to each other and connected to the lever 102 by means of pins 106 in such a manner that these clamp arms are moved together linearly along respective guides 107 in opposite directions as the lever 102 is pivotally moved. A spring 108 has one end thereof secured to a pin 109 studded in the bottom plate 48 and the other end secured to a dowel 110 on the lever 102 so as to bias the lever 102 leftwardly or rightwardly beyond the dead point on the line passing the pin 109 and shaft 103, to thereby advance or retract the clamp arms 104 and 105 and stably maintain them in such positions. Stoppers $111_1$ and $111_2$ are provided on the bottom plate 48 to stop the lever 102.

Clamp legs $112_1$ and $112_2$ are extended downwardly from the frame of the cassette 92 on the opposite sides thereof and these clamp legs have apertures 113 for receiving therein the outer end pawls $104_1$ and $105_1$ of the clamp arms 104 and 105 when they are extended outwardly.

Figure 26:
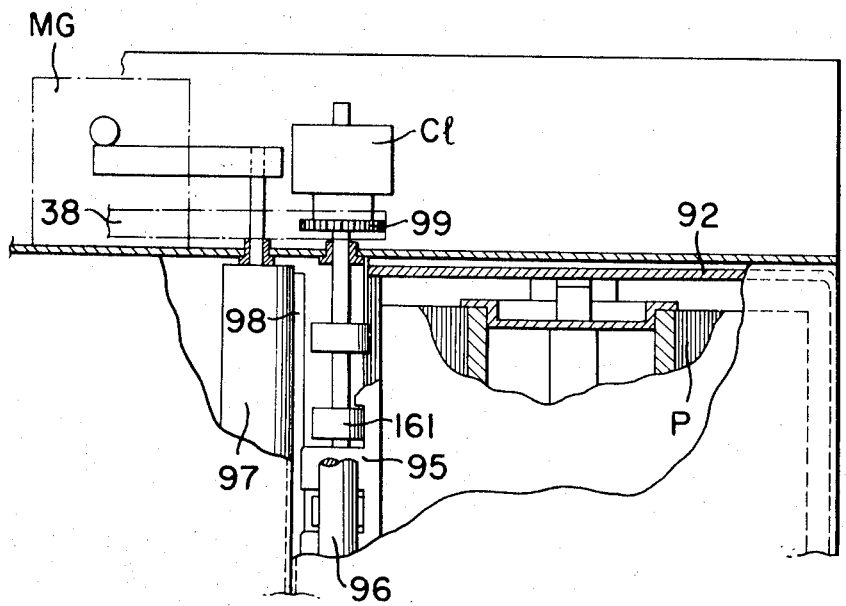

When the lever 102 is in the rightwardly biased position as viewed in FIG. 26, the clamp arms 104 and 105 are in their inwardly retracted position. If the clamp legs $112_1$ and $112_2$ of the cassette 92 are inserted through holes 114 and $114_1$ in the bottom plate 48 (FIG. 25) until they strike the wall of the apparatus body, and the lever 102 is pivoted leftwardly as viewed in FIG. 28, then the clamp arms 104 and 105 will both advance outwardly so that their end pawls $104_1$ and $105_1$ will be received into the apertures 113 in the clamp legs $112_1$ and $112_2$ so as to clamp the cassette 92 to the machine housing 1. Such clamped position will be maintained by the spring 108.

Thus, the cassette 92 can be simply and properly held with respect to the machine housing 1 without any deviation caused by vibrations or like movements of the apparatus.

The clamp lever 102 and clamp arms 104 and 105 may alternatively be mounted on the upper surface of the bottom plate 48 and the clamp arms may be engaged with the clamp apertures. In such a case, the cassette 92 must of course be provided with necessary escape means. Also, in combination with the clamp arms 104 and 105, use may be made of sloped cams so as to cause the clamp pawls to vertically engage and disengage the clamp holes formed in the bottom plate of the cassette 92.

A window may be formed in one of the side walls or the lid 93 of the cassette 92 for viewing the roll of copying medium P contained in the cassette (see FIG. 27).

Figure 29:
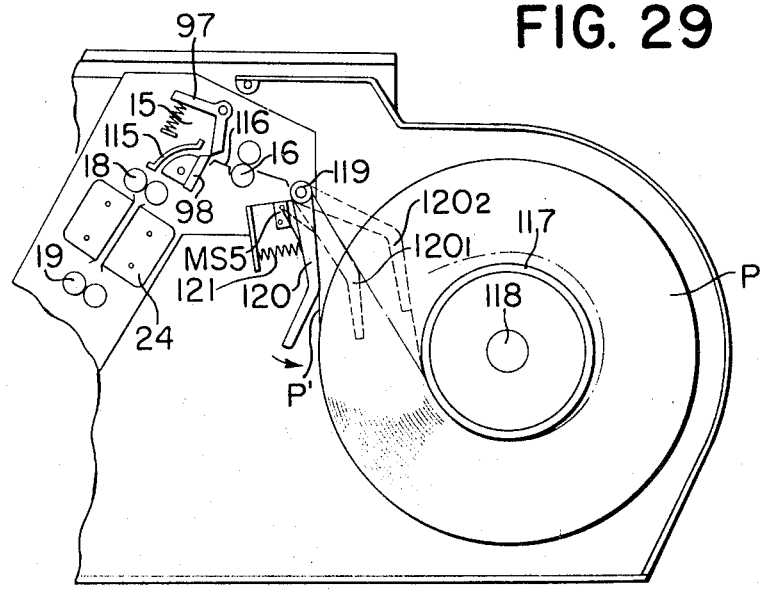
FIG. 29 is a sectional view showing an example of the copying apparatus provided with means for disposing of the last fraction of the copying medium.
Figure 31:
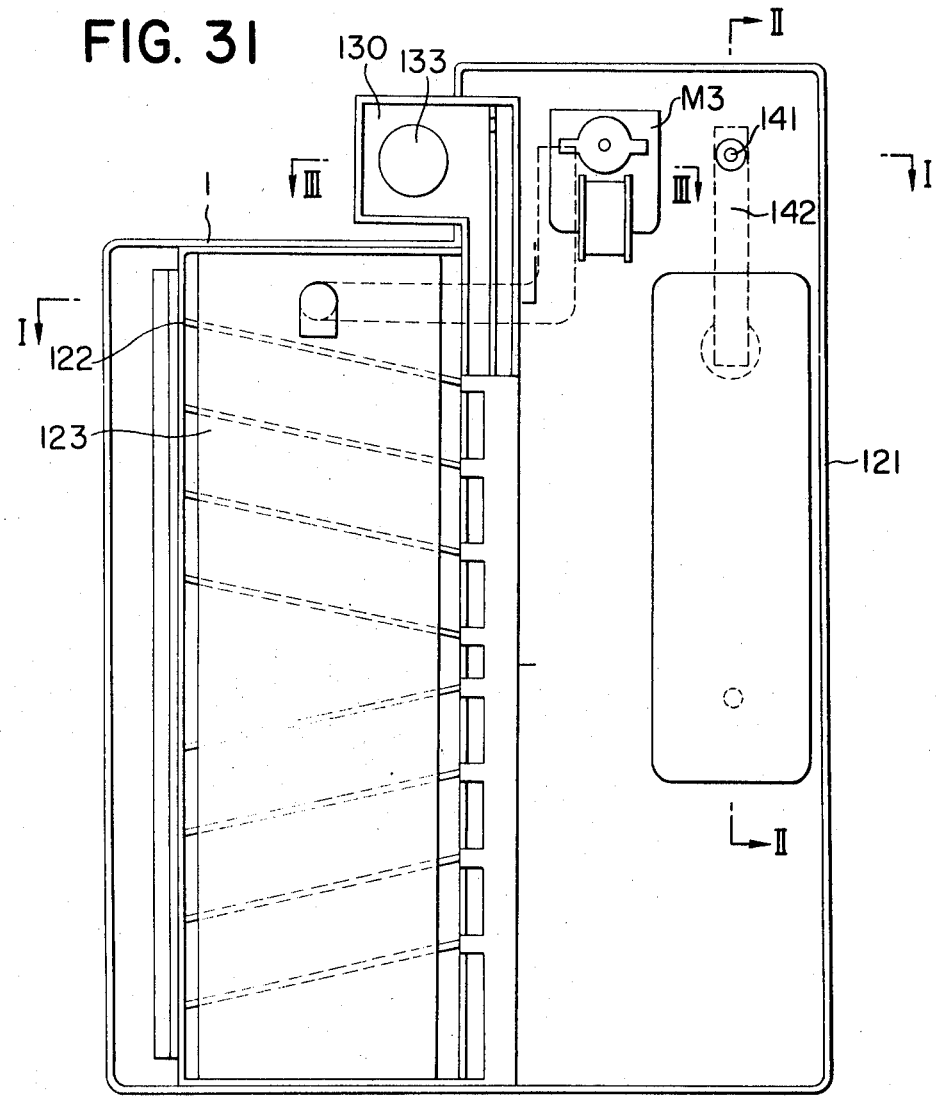
FIG. 31 is a plan view of the developing means.
Figure 34:
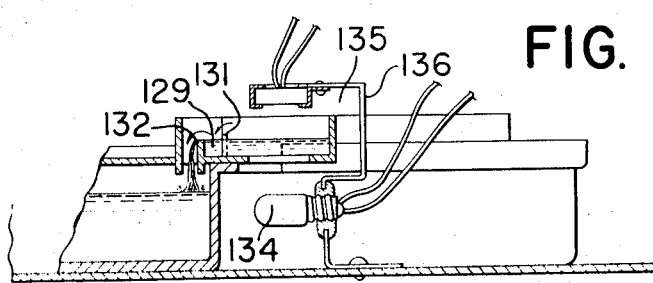
Figure 33:
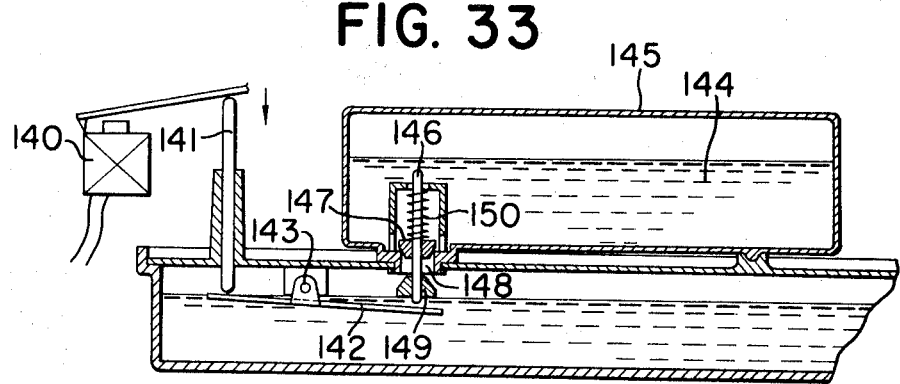

Referring now to FIG. 29, there is shown an example of the means for disposing of the last fraction or piece of the copying medium. In the copying apparatus in which web of copying medium fed intermittently from a supply roll by means of feed rollers 16 intermittently driven in synchronism with the original carriage is cut into sheets of a length corresponding to size of the original, as described above, there is usually left a fraction of the copying medium when the supply roll is used up. Such a fraction of the copying medium is unusable for copying because of its insufficient length and must be suitably disposed of so that it may not cause the problem of jamming. The shown means provides a solution to this problem.

The intermittently driven feed roller 16 is connected through electromagnetic clutch C1 to the constantly rotating motor M1 for driving transport rollers 18, 19 and so on. The electromagnetic clutch C1 is operated in association with the movement of the original carriage to control the rotation of the feed roller 16. The size of the original to be copied is detected by means of cam 60 and microswitch MS4, which then stops the rotation of the feed roller 16 operatively connected to the constantly rotating drive system through the clutch C1, thereby stopping the feed of the copying medium. Thereupon, as shown in FIG. 14, the circuit to plunger MG is closed to operate the movable cutting edge 98 of the cutter means 15 to cut the copying medium.

When the stock of copying medium P on the supply roll comes near to an exhaustion after repeated cycles of copying operation, there is left the last fraction of the copying medium whose length is too short to be used for copying. Such a residual fraction of the copying medium is often shorter than the length of the path between the intermittently driven feed roller 16 and the constantly driven transport rollers 18. If such a short fraction should be fed inadvertently, its trailing edge will leave the intermittently driven roller 16 before its leading edge reaches the first transport rollers 18, with a result that such fraction stays along the guide 115 disposed between two sets of transport rollers 16 and 18. Where the residual fraction is extremely short, such fraction may often stay at the guide 116 between the feed roller 16 and the cutting edges of the cutter means 15 just after the cutting operation. If a new supply roll of copying medium is introduced and fed with the residual fraction remaining in such position, the new copying medium thus fed will be blocked by the residual fraction and there will occur a jam in the apparatus. If the residual fraction is somewhat longer than the length of the path between the two sets of transport rollers 18 and 19 but shorter than the distance between any other two sets of transport rollers, such fraction will also cause a jam somewhere in its path.

To prevent this, the present invention provides the detection of a slack of tension occurring in the last fraction of the copying medium when its leading edge has left the supply roll core 117. In response to the detection signal, the cutter means is deactivated while the intermittently driven feed roller 16 is converted into a continuously driven mode so as to continuously drive the last fraction of the copying medium through the apparatus to follow the preceding sheet of copying medium until the last fraction is safely discharged out of the apparatus.

The means of the present invention will now be described with respect to a specific example thereof shown in FIG. 29. There is a guide roller 119 for guiding the copying medium P from the supply roll on the shaft 118 toward the intermittently driven feed roller 16. Pivotally mounted on the shaft of the guide roller 119 is an arm 121 having one end thereof connected to a spring 120, which always biases the arm 121 in the direction indicated by an arrow so that the arm may bear against the taut surface P' of the copying medium formed between the supply roll and the guide roller 119. Design is usually made such that the supply roll of copying medium P is mounted for frictional rotation with respect to the roll shaft 118 so as to prevent the copying medium from slackening between the supply roll and the intermittently driven feed roller 16 by the utilization of the rotational inertia of the supply roll P. Thus, the portion of the copying medium indicated by P' is always maintained taut. Near the portion P' and inwardly of the arm 121, there is disposed a circuit change-over microswitch MS5 as will be described.

When the stock of copying medium P is still sufficient on the supply roll, the arm 120 remains in the position as indicated by solid lines. As the supply roll reduces its diameter, the arm 120 is pivotally moved to successively assume the positions indicated by imaginary lines $120_1$ and $120_2$. When the last fraction of the copying medium leaves the roll core 117 at last, the fraction loses its tension and becomes slack to allow the arm 120 to freely pivot in the counter-clockwise direction until a projection formed in the arm 120 actuates the microswitch MS5.

Upon actuation of the microswitch MS5, the circuit of the microswitch MS4 already described with respect to FIG. 14 is disconnected to deenergize the plunger MG. Thus, cutting operation cannot take place even if the trailing edge of the original to be copied leaves the microswitch MS4. Also, if the electromagnetic clutch C1 is deenergized upon energization of the contact Y2 of the relay Y and the trailing edge of the original leaves the microswitch MS4, the feed roller 16 may be driven by the preceding sheet of copying medium which is being transported by the transport rollers 18, 19 and 20.

DEVELOPER DENSITY DETECTOR MEANS

Referring now to FIGS. 30 to 36, there is shown an example of the developer density detection means according to the present invention. This is characterized in that a chamber for detecting the density of developing liquid is provided in the developing means and that detector means having a light source and a light receiving element is mounted on the machine housing 1 so as to be opposed to the said density detection chamber when the developing means is assembled to the machine housing 1.

The developing means includes a developer tank 121, a developing plate 122 and a developing electrode 123. The arrangement is such that a sheet of copying medium P is passed along the path defined between the developing plate 122 and the developing electrode 123 with ribs 124 of plate 122 serving as guide. Developing liquid 125 is supplied from the tank 121 to the inner side of the electrode 123 by means of a pump 126 driven from motor M3, via a pipe 127. The developing liquid introduced to the developing electrode 123 is discharged through an outlet 127 into the developing 122 and overflows for circulation into the tank 121 through openings 128 formed in one edge of the plate 122.

A channel 129 is provided to direct part of the overflow 125 into a density detection chamber 130. The channel 129 has a bank 132 formed axially thereof and having a height lower than a partition 131 forming part of the edge of the developing plate 122. Such bank 132 serves to maintain the liquid in the density detection chamber 130 at a predetermined level. The density detection chamber 130 has a window 133 formed at the bottom thereof and made of transparent material such as glass. In the density detection chamber 130, the developing liquid is always flowing and never stagnant. A light source 134 and a light receiving element 135, which together form density detector means, are supported in opposed relationship by an angle 136 in such a manner that the light source 134 and the light receiving element 135 embrace therebetween the density detection chamber 130 and are aligned with the window 133 when the developing means 26 is assembled to the machine housing 1.

After the assemblage of the developing means 26 to the machine housing 1, if a number of copies has been produced to reduce the density of the developing liquid 125, the transmittivity of light passing from the light source 134 through the developing liquid in the chamber 130 to the light receiving element 135 will be varied with the varying density of the developing liquid, thereby reducing the resistance value of the light receiving element 135. Thus, the voltage drop will be increased in a resistor 137 in the control circuit shown in FIG. 36, and when the voltage drop exceeds a certain threshold, a switching circuit 138 will be operated to supply power through a time-limit power switching circuit 139 to a solenoid circuit 140 for a predetermined time, thereby depressing a push rod 141 a predetermined stroke.

The push rod 141 thus depressed will pivotally move an associated member 142 about a shaft 143 so that one end of the member 142 will raise a valve rod 146 passing through a vessel 145 containing therein condensed developing liquid 144, to thereby open a supply port 148 normally closed by a valve 147 while closing an outlet 149 by means of a valve 149, thus filling the supply port with a predetermined amount of condensed developing liquid 144.

After a time determined by the time-limit power switching circuit 139, the depression of the push rod 141 is released to allow the valve rod 146 to be downwardly biased by a spring 150, so that the valve 147 closes the constant supply port 148 and the valve 149 opens the outlet 149 to thereby allow a predetermined amount of condensed liquid to drop through the outlet into the tank 121.

The described operation may be automatically repeated thereafter until an optimum density is recovered in the developing liquid 125. Such optimum condition will be detected by the described density detector means, whereupon the push rod 141 will stop its operation.

Figure 35:
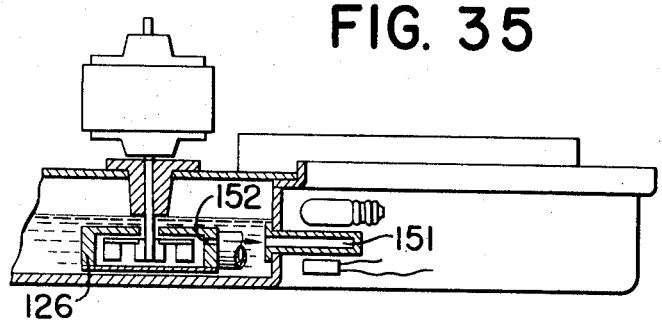
FIG. 35 is an elevational view, partly in cross section, of another example of the developing means.
Figure 36:
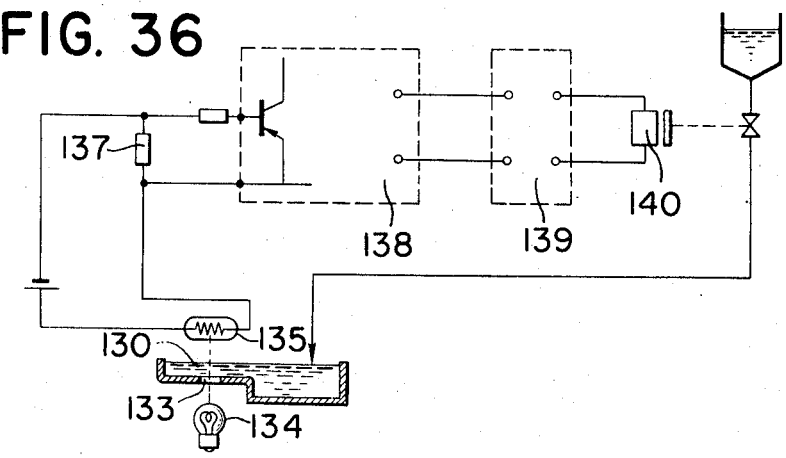
FIG. 36 diagrammatically shows the electric circuit for controlling the developing means.
Figure 37:
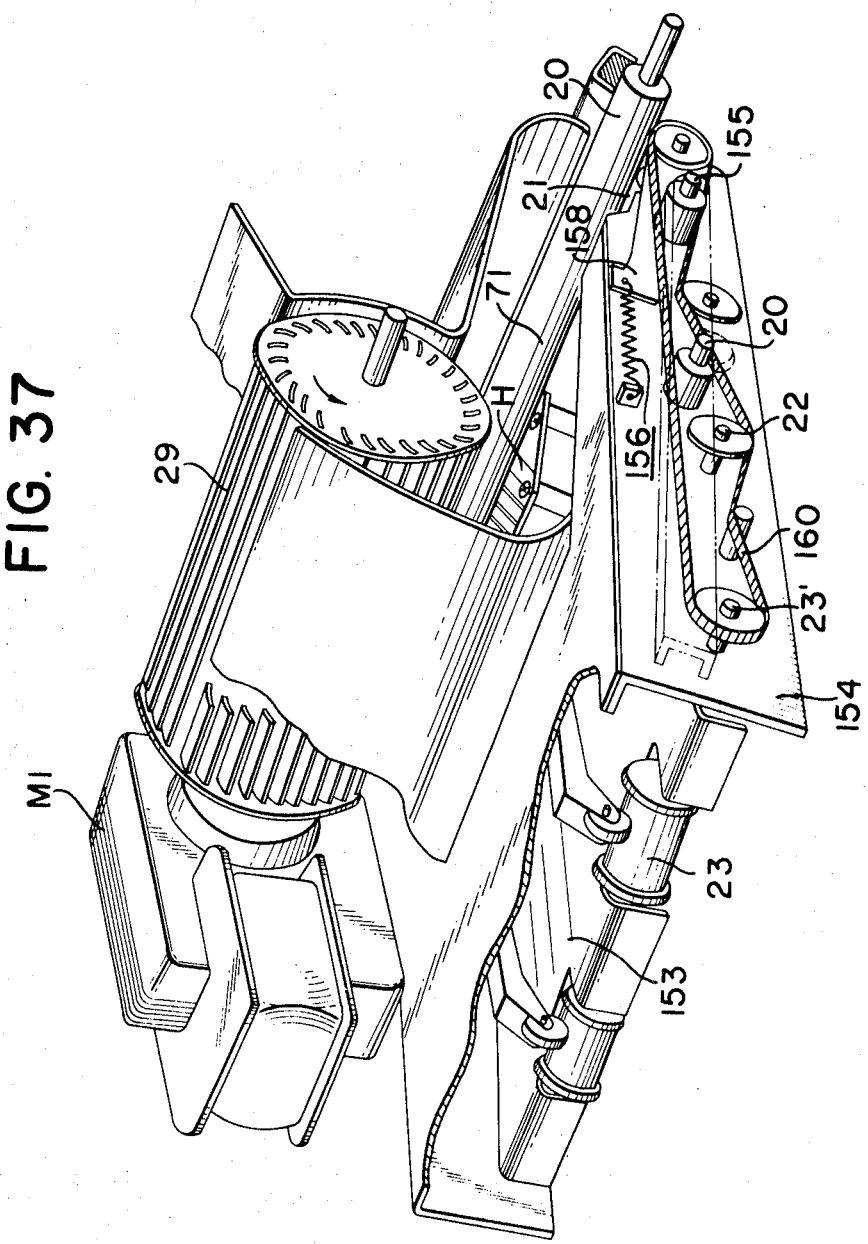
FIG. 37 is a perspective view showing an example of the fixing means usable with the apparatus of the present invention.
Figure 38:
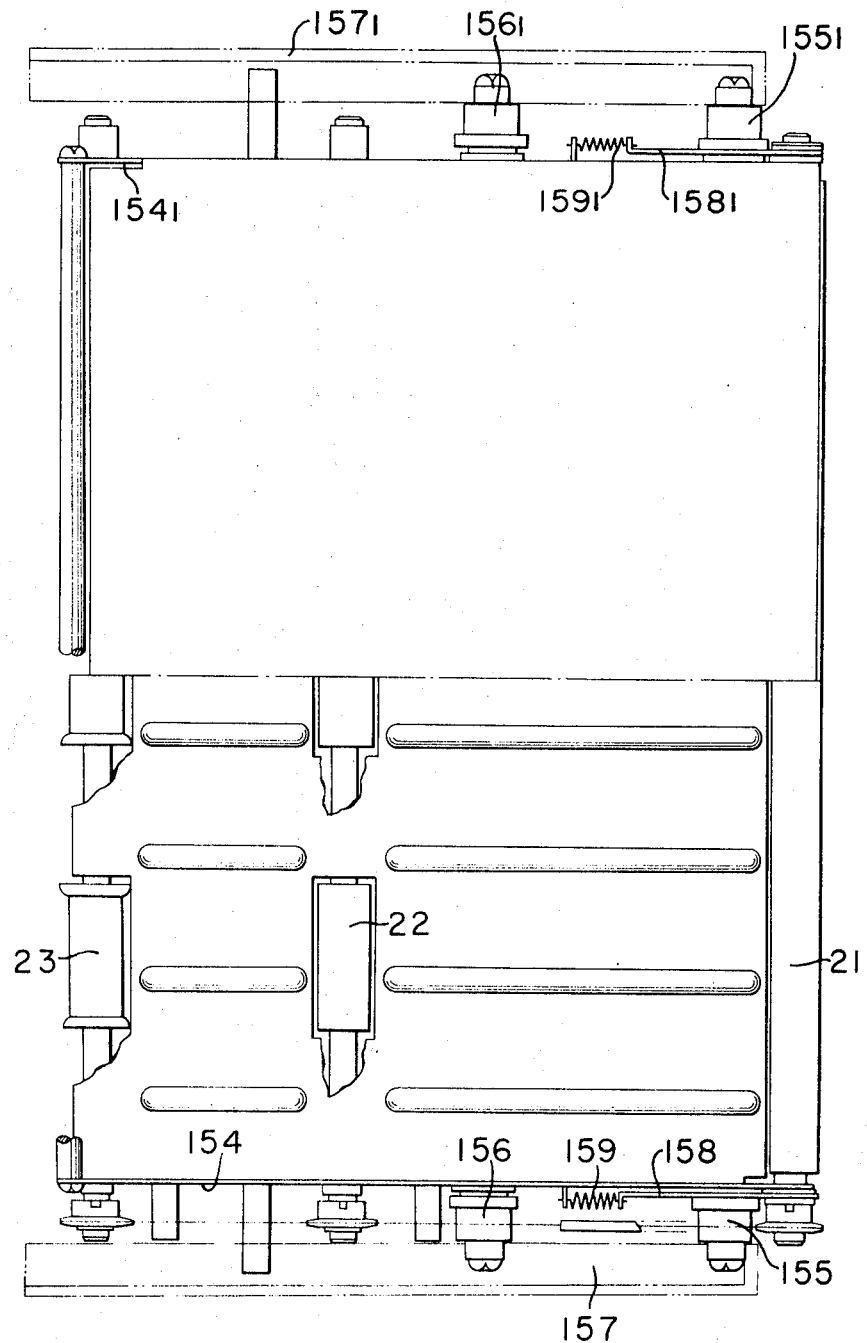
FIG. 38 is a plan view of the same fixing means.
Figure 39:
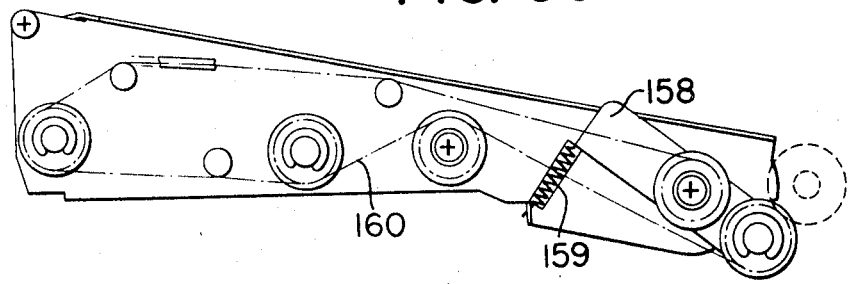
FIGS. 39 to 41 are sectional views taken along lines A—A, B—B and C—C of FIG. 38, respectively.
Figure 40:
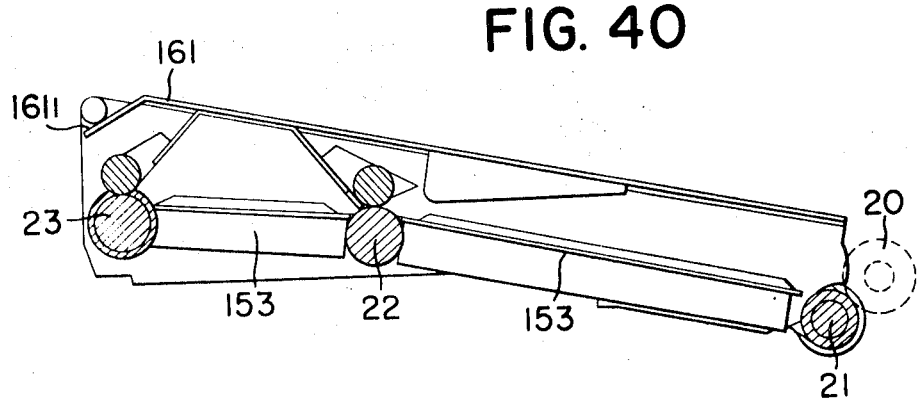

While the density detection chamber 130 has been shown to be formed in the channel for the developing liquid overflowing the developing plate 123, it is alternatively possible, as shown in FIG. 35, to provide a small projected chamber 151 formed of transparent material such as acrylic resin and disposed in a side wall of the tank 121 below the level of the liquid in that tank. Preferably, the small chamber 151 may be located near the inlet of the pump 126 so that developing liquid injected from the pump 126 through a small hole 152 formed in the outer wall thereof may flow straight into the inlet of the small chamber 151 for circulation therein.

According to the present invention, as described above, liquid density detection chamber is provided in the developing means 26 and density detector means is mounted to the machine housing so that it is opposed to the detection chamber when the developing means has been assembled to the machine housing. Thus, the developing means is structurally quite separate from the copying apparatus housing and this eliminates the various disadvantages of the prior art such as troublesome assemblage and disassemblage of the developing means to the apparatus body and danger of firing caused by short-circuiting of the detector circuit.

FIXING MEANS

Referring to FIGS. 37 to 41, there is illustrated an example of fixing means according to the present invention. This embodiment enables any sheet of copying medium jammed in the fixing means to be readily removed therefrom, and comprises a unit structure which can be readily assembled and disassembled with respect to the machine housing 1. Such unit is provided with a driven roller forming one of two developer squeeze rollers while the other roller acting as the driving roller is provided in the machine body.

A sheet of copying medium having passed through electrically charging means 24 and through exposure means 25 further goes through the developing means 26 along the guides therein so as to be developed. The copying medium P wet with developing liquid is squeezed by a pair of squeeze rollers, one of which is a driven roller of rubber hereinafter referred to as "rubber roller 21" and the other roller is a drive roller of iron hereinafter referred to as "iron roller 20". Thereafter the copying sheet is moved to fixing means 27. Warm air heated by illuminator lamp 8 or heater H is introduced into the fixing means 27 through blower 29 and blown against the still somewhat wet surface of the copying medium P which has just been discharged by the squeeze rollers, to thereby dry the copying medium while it is carried along the guide 153 of the fixing means. Thereafter the copying medium P is discharged through the transport rollers 22 and 23 of the fixing means 27 onto the tray 28.

Figure 41:
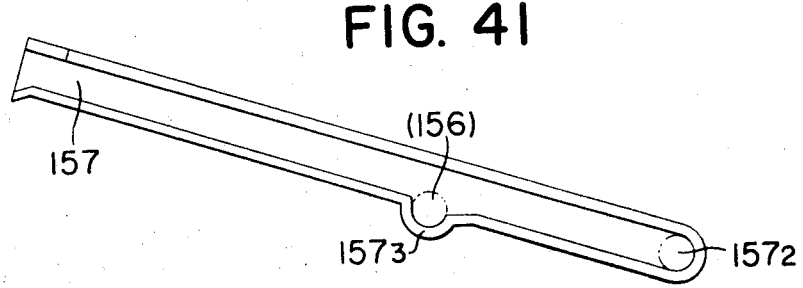

When the fixing means 27 is inserted into the machine housing along the guide until front dowels 155 and $155_1$ strike the ends $157_2$ of guides 157 and $157_1$, the fixing means 27 may be depressed so that dowel 156 is received into recess $157_3$ formed in each guide 157 and $157_1$, in the manner as shown in FIG. 41. At this time, the fixing means 27 is downwardly urged at dowels 156 and $156_1$ by unshown keep spring means secured to the machine housing so that the fixing means 27 can be positively mounted to the machine housing. The rubber roller 21 is then in contact with the iron roller 20 and further pushed inwardly, but the rubber roller 21 is helped to escape by rotatable arms 158 and $158_1$ (FIG. 39) against the force of springs 159, and pressed into contact with the iron roller 20 by the spring force. Removal of the fixing means 27 from the apparatus may be accomplished by pulling it out while raising it. The drive of the fixing means is achieved by the transmission of power from the iron roller 20 to the rubber roller 21 through friction therebetween or through gearing and further to a ladder chain 160 and rollers 22 and 23.

After developed, the copying medium P is passed between the squeeze rollers and into the fixing means 27, where the copying medium is dried by warm air from the blower while being discharged out of the apparatus, as described previously. To accomplish the discharge smoothly, the outlet end portion $161_1$ of cover 161 for the fixing means is downwardly bent so as to direct the warm air from the blower downwardly to thereby prevent the trailing edge of the copying medium from being jammed in the neighborhood of the rollers 23 as well as to obviate the copying medium from being flown away.

We claim:

1. An electrophotographic copying apparatus comprising a housing, an original carriage slidably connected to an upper portion of said housing for horizontal reciprocal movement in the direction of a longitudinal dimension of said housing, means for reciprocally moving said carriage in said longitudinal direction, means for illuminating an original disposed on said carriage, said illuminating means being fixedly mounted to said housing at a position below said carriage and centrally disposed with respect to said longitudinal housing dimension, electrical charging means and exposure means mounted in said housing, means for conducting a sheet of copy paper obliquely downward through said charging means and said exposure means, fixing-drying means disposed in a lower portion of said housing at a position spaced in said longitudinal direction from said charging means and exposure means, developing means mounted in a lower portion of said housing and disposed longitudinally between said exposure means and said fixing-drying means, optical means including a plurality of mirrors and in-mirror lens means for optically projecting an image of said illuminated original on said carriage along a folded light path to said sheet of copy paper conducted through said exposure means, means mounting said mirrors and lens longitudinally centrally of said housing above said developing means and below said carriage, and cooling means disposed above said fixing-drying means and on a longitudinally opposed side of said optical means from said charging means, wherein said cooling means is for directing air surrounding said illuminating means toward said fixing-drying means, and further comprising a first pair of parallel rails mounted on said housing, a second pair of parallel rails mounted on said original carriage, wherein the rails of said first pair are aligned for cooperation respectively with the rails of said second pair, and wherein each of said rails of said first pair has two surfaces opposed and parallel to two surfaces of the said rail of the second pair cooperatively aligned therewith, means including one of said rail surfaces of each said rail defining a pair of cavities extending longitudinally of said rails, first and second retainer means disposed respectively within said cavities, first and second pluralities of rollers mounted on said respective first and second retainer means for engaging said rails defining said cavities, and third and fourth pluralities of rollers mounted on said housing and engageable with respective upper surfaces of said pair of rails mounted on said original carriage.

2. An electrophotographic copying apparatus comprising a housing, an original carriage slidably connected to an upper portion of said housing for horizontal reciprocal movement in the direction of a longitudinal dimension of said housing, means for reciprocally moving said carriage in said longitudinal direction, means for illuminating an original disposed on said carriage, said illuminating means being fixedly mounted to said housing at a position below said carriage and centrally disposed with respect to said longitudinal housing dimension, electrical charging means and exposure means mounted in said housing, means for conducting a sheet of copy paper obliquely downward through said charging means and said exposure means, fixing-drying means disposed in a lower portion of said housing at a position spaced in said longitudinal direction from said charging means and exposure means, developing means mounted in a lower portion of said housing and disposed longitudinally between said exposure means and said fixing-drying means, optical means including a plurality of mirrors and in-mirror lens means for optically projecting an image of said illuminated original on said carriage along a folded light path to said sheet of copy paper conducted through said exposure means, means mounting said mirrors and lens longitudinally centrally of said housing above said developing means and below said carriage, and cooling means disposed above said fixing-drying means and on a longitudinally opposed side of said optical means from said charging means, wherein said cooling means is for directing air surrounding said illuminating means toward said fixing-drying means, and wherein said illuminating means includes a shield having a slit therein through which light is directed to said original, said slit having a longitudinal dimension of $\Delta a$, and further comprising means for loading and feeding a roll of copying medium for being cut to provide sheets of said copy paper, first actuator means mounted on said original carriage for selecting a length L to which said roll of copying medium is to be cut to provide said copy paper sheets, means for cutting said copying medium, means interconnecting said selecting means and said cutting means for operating said cutting means under the control of said selecting means, and control means connected to said reciprocal moving means to control forward and backward strokes of said original carriage, wherein said forward stroke has a minimum length equal to $2l$, where $l$ is a distance between a start position of a leading edge of said copying medium and said exposure means, and wherein when said Length L is greater than the difference between $2l$ and $\Delta a$, said original carriage moves forward a distance equal to L and then moves backward a distance $L-l$, whereupon the copying medium is cut and said original carriage continues its backward movement.

3. An electrophotographic copying apparatus as set forth in claim 2, in which said original carriage has an original reference line thereon, and in which said control means includes second actuator means positioned to define said distance $2l$, third actuator means connected to said first actuator means for movement therewith to control backward movement of said original carriage, and switch means mounted on said housing for operation by said second and third actuator means and connected to said reciprocal moving means, wherein said third actuator means is positioned at a distance $L-l$ from a predetermined reference line on said original carriage.

4. An electrophotographic copying apparatus comprising a housing, an original carriage slidably connected to an upper portion of said housing for horizontal reciprocal movement in the direction of a longitudinal dimension of said housing, means for reciprocally moving said carriage in said longitudinal direction, means for illuminating an original disposed on said carriage, said illuminating means being fixedly mounted to said housing at a position below said carriage and centrally disposed with respect to said longitudinal housing dimension, electrical charging means and exposure means mounted in said housing, means for conducting a sheet of copy paper obliquely downward through said charging means and said exposure means, fixing-drying means disposed in a lower portion of said housing at a position spaced in said longitudinal direction from said charging means and exposure means, developing means mounted in a lower portion of said housing and disposed longitudinally between said exposure means and said fixing-drying means, optical means including a plurality of mirrors and in-mirror lens means for optically projecting an image of said illuminated original on said carriage along a folded light path to said sheet of copy paper conducted through said exposure means, means mounting said mirrors and lens longitudinally centrally of said housing above said developing means and below said which is centrally disposed of an equilateral triangle including the sides forming said first angle.

5. An electrophotographic copying apparatus comprising a housing, an original carriage slidably connected to an upper portion of said housing for horizontal reciprocal movement in the direction of a longitudinal dimension of said housing, means for reciprocally moving said carriage in said longitudinal direction, means for illuminating an original disposed on said carriage, said illuminating means being fixedly mounted to said housing at a position below said carriage and centrally disposed with respect to said longitudinal housing dimension, electrical charging means and exposure means mounted in said housing, means for conducting a sheet of copy paper obliquely downward through said charging means and said exposure means, fixing-drying means disposed in a lower portion of said housing at a position spaced in said longitudinal direction from said charging means and exposure means, developing means mounted in a lower portion of said housing and disposed longitudinally between said exposure means and said fixing-drying means, optical means including a plurality of mirrors and in-mirror lens means for optically projecting an image of said illuminated original on said carriage along a folded light path to said sheet of copy paper conducted through said exposure means, means mounting said mirrors and lens longitudinally centrally of said housing above said developing means and below said carriage, and cooling means disposed above said fixing-drying means and on a longitudinally opposed side of said optical means from said charging means, wherein said cooling means is for directing air surrounding said illuminating means toward said fixing-drying means, and wherein the exposure plane of said exposure means is disposed at a first angle of about 60° with respect to the surface of the original, said in-mirror lens means of said optical system has its optic axis disposed substantially on the midline of said angle, and said plurality of mirrors of said optical system consists of two reflecting mirrors disposed on the opposite sides of said optic axis in planes forming respective angles of about 60° with respect to said optic axis, so that said optic axis intersects the planes of said two reflecting mirrors at a point which is centrally disposed of an equilateral triangle including the sides forming said first angle.

6. An electrophotographic copying apparatus as defined in claim 5, further comprising means for loading and feeding a roll of copying medium for being cut to provide sheets of said copy paper, said loading and feeding means including a roll supporting shaft having one end thereof hinge-connected to said housing, a roll holding spool mounted on said shaft and consisting of two sections separably connected together longitudinally thereof, and a friction member provided within one of said two spool sections for releasably restricting axial movement of said one spool section and blocking rotation thereof while said two spool sections are being connected, whereby said separable spool sections securely hold said roll of copying medium and provide convenient structure for mounting and replacing said roll.

7. An electrophotographic copying apparatus as defined in claim 5, wherein said illuminating means includes a lamp and reflector means, and wherein said reflector means is formed with through-apertures for controlling the amount of reflected light to thereby provide a uniform intensity of light across the original in the direction normal to the directions of reciprocal movement of the original.

8. An electrophotographic copying apparatus as set forth in claim 5, further comprising means for loading and feeding a roll of copying medium for being cut to provide sheets of said copy paper, said loading and feeding means including a cassette removably mounted on said housing, wherein said roll of copying medium is received within said cassette, a copy medium drive roller mounted on said housing, and a driven roller mounted on said cassette for being driven by said drive roller, wherein said copy medium is nipped between said drive and driven rollers for advancement to said charging means.

9. An electrophotographic copying apparatus as set forth in claim 5, in which said developing means includes a container of developing liquid, a density detection chamber disposed within said container, a transparent container wall defining a lower portion of said detection chamber and detector means including a light source and a light sensing element disposed in a spaced relation with said transparent container wall disposed therebetween.

10. An electrophotographic copying apparatus as set forth in claim 5, in which said fixing means is removably mounted within said housing and includes a driven squeeze roller, and further comprising a drive squeeze roller mounted on said housing for cooperation with said driven roller to squeeze said copy paper therebetween.

* * * * *

UNITED STATES PATENT OFFICE
CERTIFICATE OF CORRECTION

Patent No. 3,740,132  Dated June 19, 1973

Inventor(s) SHIGEHIRO KOMORI, ET AL.

It is certified that error appears in the above-identified patent and that said Letters Patent are hereby corrected as shown below:

Column 4, line 36, change "pate" to read --plate--;

Column 8, line 18, change "$1\ell_2$" to read --$2\ell_2$--;

Column 8, line 35, change "MS3" to read --MS4--;

Column 8, line 53, change "MS2" to read --MS1--;

Column 8, line 60, change "MS3" to read --MS4--;

Column 12, line 66, change "down-stream" to read --downstream--;

Column 13, line 27, "is", second occurrence, should read -- in --.

Column 18, line 10, change "unusuable" to read --unusable--;

Column 19, line 27, change "the" (second occurrence) to read --that--;

Column 24, lines 29-31, delete in their entireties and insert the following:

--and below said carriage, and cooling means disposed above said fixing-drying means and on a longitudinally opposed side of said optical means from said charging means, wherein said cooling means is for directing air surrounding

UNITED STATES PATENT OFFICE
CERTIFICATE OF CORRECTION

Patent No. 3,740,132            Dated June 19, 1973

Inventor(s) SHIGEHIRO KOMORI, ET AL.

It is certified that error appears in the above-identified patent and that said Letters Patent are hereby corrected as shown below:

Column 24, lines 29-31 (Cont'd)

said illuminating means toward said fixing-drying means, and further comprising means for loading and feeding a roll of copying medium for being cut to provide sheets of said copy paper, means for selecting a length to which said roll of copying medium is to be cut to provide said copy paper sheets, means for cutting said copying medium, means interconnecting said selecting means and said cutting means for operating said cutting means under the control of said selecting means, means for detecting a last fraction of said copying medium having a length which is less than a predetermined minimum, and means for preventing operation of said cutting means in response to detection of said last

UNITED STATES PATENT OFFICE
CERTIFICATE OF CORRECTION

Patent No. 3,740,132  Dated June 19, 1973

Inventor(s) SHIGEHIRO KOMORI, ET AL.

It is certified that error appears in the above-identified patent and that said Letters Patent are hereby corrected as shown below:

Column 24, lines 29-31 (Cont'd)

fraction of copying medium by said detecting means to thereby allow said last fraction of copying medium to be transported through said apparatus without being cut.--

Signed and sealed this 19th day of February 1974.

(SEAL)
Attest:

EDWARD M. FLETCHER, JR.
Attesting Officer

C. MARSHALL DANN
Commissioner of Patents